US010323954B2

(12) United States Patent
Wan et al.

(10) Patent No.: US 10,323,954 B2
(45) Date of Patent: Jun. 18, 2019

(54) NAVIGATION SYSTEM WITH PREFERENCE ANALYSIS MECHANISM AND METHOD OF OPERATION THEREOF

(71) Applicant: Telenav, Inc., Santa Clara, CA (US)

(72) Inventors: Feng Wan, Mountain View, CA (US); Hengbin Luo, San Jose, CA (US); Yogesh Agrawal, Fremont, CA (US); Shannph Wong, Foster City, CA (US)

(73) Assignee: Telenav, Inc., Santa Clara, CA (US)

( * ) Notice: Subject to any disclaimer, the term of this patent is extended or adjusted under 35 U.S.C. 154(b) by 45 days.

(21) Appl. No.: 15/249,767

(22) Filed: Aug. 29, 2016

(65) Prior Publication Data

US 2018/0058875 A1 Mar. 1, 2018

(51) Int. Cl.
*G01C 21/34* (2006.01)
*G01C 21/36* (2006.01)

(52) U.S. Cl.
CPC ..... *G01C 21/3641* (2013.01); *G01C 21/3484* (2013.01)

(58) Field of Classification Search
CPC ............ G01C 21/3641; G01C 21/3484
USPC ........................................ 701/411
See application file for complete search history.

(56) References Cited

U.S. PATENT DOCUMENTS

| | | | |
|---|---|---|---|
| 6,144,917 A | 11/2000 | Walters et al. | |
| 6,216,086 B1 * | 4/2001 | Seymour | G01C 21/3446 701/425 |
| 7,356,405 B1 | 4/2008 | Nesbit et al. | |
| 7,419,095 B2 | 9/2008 | Yoshioka et al. | |
| 2003/0028322 A1 | 2/2003 | Ogawa | |
| 2003/0093217 A1 * | 5/2003 | Petzold | G01C 21/3484 701/411 |
| 2003/0130893 A1 | 7/2003 | Farmer | |
| 2007/0005240 A1 * | 1/2007 | Oumi | G01C 21/3484 701/425 |
| 2010/0332315 A1 * | 12/2010 | Kamar | G06Q 30/02 705/14.46 |
| 2012/0143492 A1 * | 6/2012 | Johnson | G01C 21/3415 701/411 |
| 2013/0191314 A1 | 7/2013 | Li et al. | |
| 2016/0209228 A1 | 7/2016 | Golding et al. | |
| 2017/0067750 A1 * | 3/2017 | Day | G01C 21/3461 |
| 2018/0051997 A1 * | 2/2018 | Grochocki, Jr. | G01C 21/3446 |
| 2018/0058875 A1 * | 3/2018 | Wan | G01C 21/3484 |

FOREIGN PATENT DOCUMENTS

WO 2009053792 A2 4/2009

* cited by examiner

*Primary Examiner* — Krishnan Ramesh

(74) *Attorney, Agent, or Firm* — Perspectives Law Group, Corp.

(57) ABSTRACT

A method of operation of a navigation system includes: identifying a non-default selection for a selected route; determining a contextual parameter corresponding to the non-default selection; and generating with a control circuit a user preference profile based on the contextual parameter of the non-default selection for representing a preference of a system user for navigation information.

20 Claims, 6 Drawing Sheets

NAVIGATION SYSTEM WITH PREFERENCE ANALYSIS MECHANISM AND METHOD OF OPERATION THEREOF

TECHNICAL FIELD

An embodiment of the present invention relates generally to a navigation system, and more particularly to a system with a user-preference analysis mechanism.

BACKGROUND ART

Modern consumer and industrial electronics, especially devices such as graphical computing systems, televisions, projectors, cellular phones, portable digital assistants, and combination devices, are providing increasing levels of functionality to support modern life including location-based information services. Research and development in the existing technologies can take a myriad of different directions.

As users become more empowered with the growth of mobile communication technology, new and old paradigms begin to take advantage of this new space. One such space is navigation functions for devices. However, in the midst of increase in information readily available to the user, balancing variety of features with user's relevant context has yet been fully utilized.

Thus, a need still remains for a navigation system with a preference analysis mechanism. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

An embodiment of the present invention provides a method of operation of a navigation system including: identifying a non-default selection for a selected route; determining a contextual parameter corresponding to the non-default selection; and generating with a control circuit a user preference profile based on the contextual parameter of the non-default selection for representing a preference of a system user for navigation information.

An embodiment of the present invention provides a navigation system, including: a control circuit configured to: identify a non-default selection for a selected route; determine a contextual parameter corresponding to the non-default selection; generate a user preference profile based on the contextual parameter of the non-default selection for representing a preference of a system user for navigation information; and a storage circuit, coupled to the control circuit, configured to store the user preference profile.

An embodiment of the present invention provides a non-transitory computer readable medium including instructions for a navigation system, including: identifying a non-default selection for a selected route; determining a contextual parameter corresponding to the non-default selection; and generating with a control circuit a user preference profile based on the contextual parameter of the non-default selection for representing a preference of a system user for navigation information.

Certain embodiments of the invention have other steps or elements in addition to or in place of those mentioned above. The steps or elements will become apparent to those skilled in the art from a reading of the following detailed description when taken with reference to the accompanying drawings.

BEST MODE FOR CARRYING OUT THE INVENTION

Figure 1:
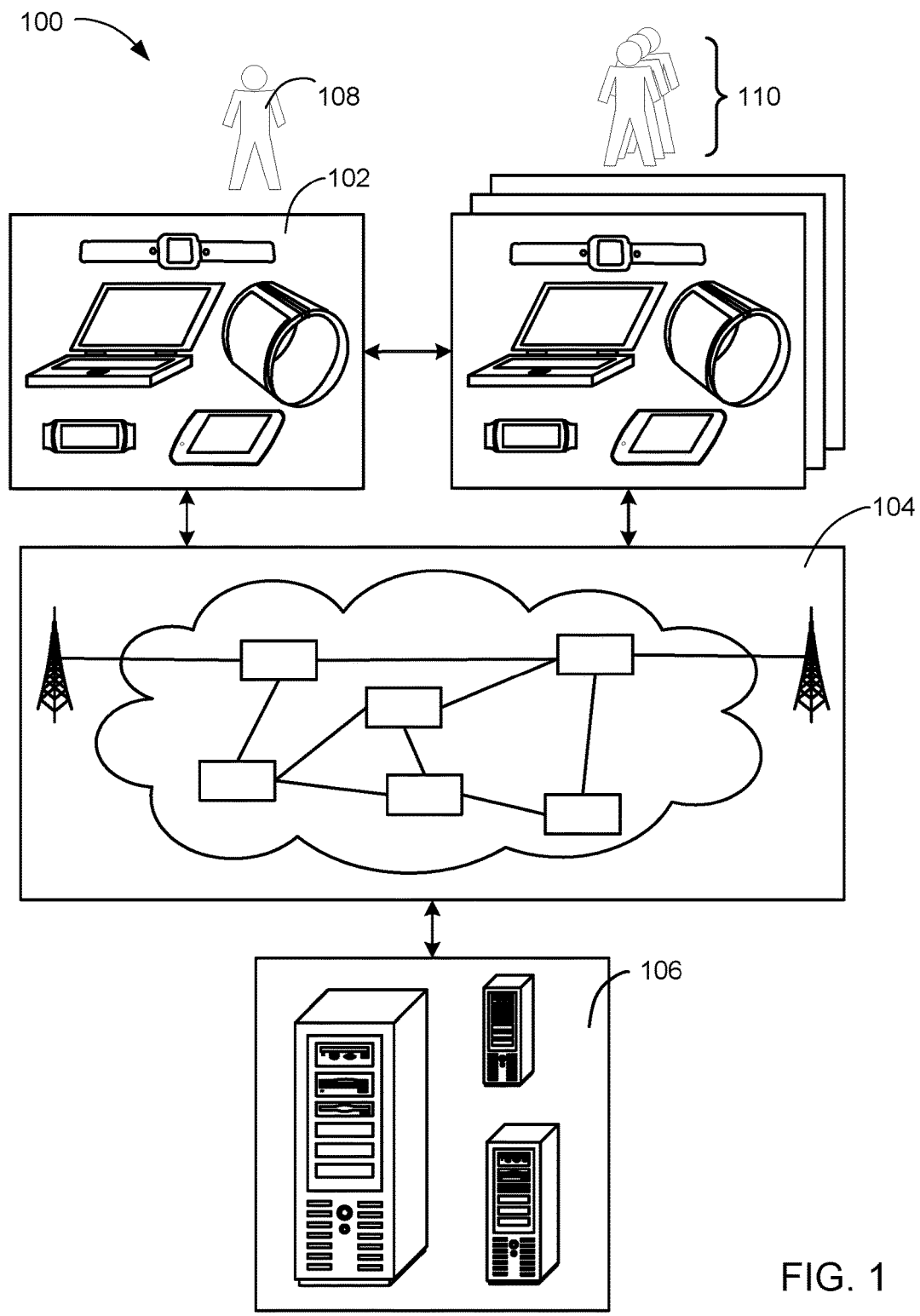
FIG. 1 is a navigation system with a preference analysis mechanism in an embodiment of the present invention.

The following embodiments can be for generating user preference profile for an end user for representing preferences in navigational information. The user preference profile can be generated based on previous traces, selected routes, contextual parameters associated thereto, or a combination thereof, and without direct input of description or identification of the preferences from the end user. The previous traces, the selected routes, or a combination thereof can be identified or classified as non-default selections. The user preference profile can be generated based on specifically processing the non-default selections. The user preference profile can serve as basis for preference-based routes in incorporating the user's preferences in providing the navigational information.

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation. The embodiments have been numbered first embodiment, second embodiment, etc. as a matter of descriptive convenience and are not intended to have any other significance or provide limitations for an embodiment of the present invention.

One skilled in the art would appreciate that the format with which navigation information is expressed is not critical to some embodiments of the invention. For example, in some embodiments, navigation information is presented in the format of (X, Y); where X and Y are two coordinates that define the geographic location, i.e., a position of a user.

In an alternative embodiment, navigation information is presented by longitude and latitude related information. In a further embodiment of the present invention, the navigation information also includes a velocity element including a speed component and a heading component.

The term "relevant information" referred to herein can include the navigation information described as well as information relating to points of interest to the user, such as local business, hours of businesses, types of businesses, advertised specials, traffic information, maps, local events, and location based community or personal information.

The term "module" referred to herein can include or be implemented as or include software, hardware, or a combination thereof in the present invention in accordance with the context in which the term is used. For example, the software can be machine code, firmware, embedded code, and application software. The software can also include a function, a call to a function, a code block, or a combination thereof. Also for example, the hardware can be gates, circuitry, processor, computer, integrated circuit, integrated circuit cores, a pressure sensor, an inertial sensor, a microelectromechanical system (MEMS), passive devices, physical non-transitory memory medium having instructions for performing the software function, a portion therein, or a combination thereof to control one or more of the hardware units or circuits.

Referring now to FIG. 1, therein is shown a navigation system 100 with a preference analysis mechanism in an embodiment of the present invention. The navigation system 100 can include a first device 102, such as a client or a server, connected to a second device 106, such as a client or server.

The navigation system 100 can include a system for searching or providing guidance or information associated with geographic locations, a regulatory system for enabling access to a device or a vehicle, or a combination thereof. The first device 102 can communicate with the second device 106 with a network 104, such as a wireless or wired network.

For example, the first device 102 can be of any of a variety of computing devices, such as a cellular phone, personal digital assistant, a notebook computer, a wearable device, internet of things (IoT) device, automotive telematics navigation system, or other multi-functional mobile communication or entertainment device. Also for example, the first device 102 can include a device or a sub-system.

The first device 102 can couple, either directly or indirectly, to the network 104 to communicate with the second device 106 or can be a stand-alone device. The first device 102 can further be separate form or incorporated with a vehicle, such as a car, truck, bus, or train.

For illustrative purposes, the navigation system 100 is described with the first device 102 as a mobile computing device, although it is understood that the first device 102 can be different types of devices. For example, the first device 102 can also be a non-mobile computing device, such as a server, a server farm, or a desktop computer.

The second device 106 can be any of a variety of centralized or decentralized computing devices, or video transmission devices. For example, the second device 106 can be a computer, grid computing resources, a virtualized computer resource, cloud computing resource, routers, switches, peer-to-peer distributed computing devices, or a combination thereof.

The second device 106 can be centralized in a single room, distributed across different rooms, distributed across different geographical locations, embedded within a telecommunications network. The second device 106 can couple with the network 104 to communicate with the first device 102. The second device 106 can also be a client type device as described for the first device 102.

For illustrative purposes, the navigation system 100 is described with the second device 106 as a non-mobile computing device, although it is understood that the second device 106 can be different types of computing devices. For example, the second device 106 can also be a mobile computing device, such as notebook computer, another client device, a wearable device, or a different type of client device. The second device 106 can be a standalone device, or can be incorporated with a vehicle, such as a car, a truck, a bus, or a train.

Also for illustrative purposes, the navigation system 100 is described with the second device 106 as a computing device, although it is understood that the second device 106 can be different types of devices. Also for illustrative purposes, the navigation system 100 is shown with the second device 106 and the first device 102 as end points of the network 104, although it is understood that the navigation system 100 can have a different partition between the first device 102, the second device 106, and the network 104. For example, the first device 102, the second device 106, or a combination thereof can also function as part of the network 104.

The network 104 can span and represent a variety of networks. For example, the network 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the network 104. Further, the network 104 can traverse a number of network topologies and distances. For example, the network 104 can include direct connection, personal area network (PAN), local area network (LAN), metropolitan area network (MAN), wide area network (WAN), or a combination thereof.

The navigation system 100 can be used by a system user 108, further participants 110, or a combination thereof. The system user 108 can include a person or an entity accessing or utilizing the navigation system 100 or a device therein. For example, the system user 108 can include a person owning or operating the first device 102. Also for example, the system user 108 can access or utilize the second device 106 through the first device 102.

The further participants 110 can include multiple people or entities accessing or utilizing the navigation system 100 or one or more devices therein. The further participants 110 can include the people or entities different and separate from the system user 108. For example, the further participants 110 can each own, access, use, or a combination thereof for a separate device other than the first device 102. Also for example, the further participants 110 can each access or utilize the second device 106 through the separate device corresponding to each of the further participants 110.

Figure 2:
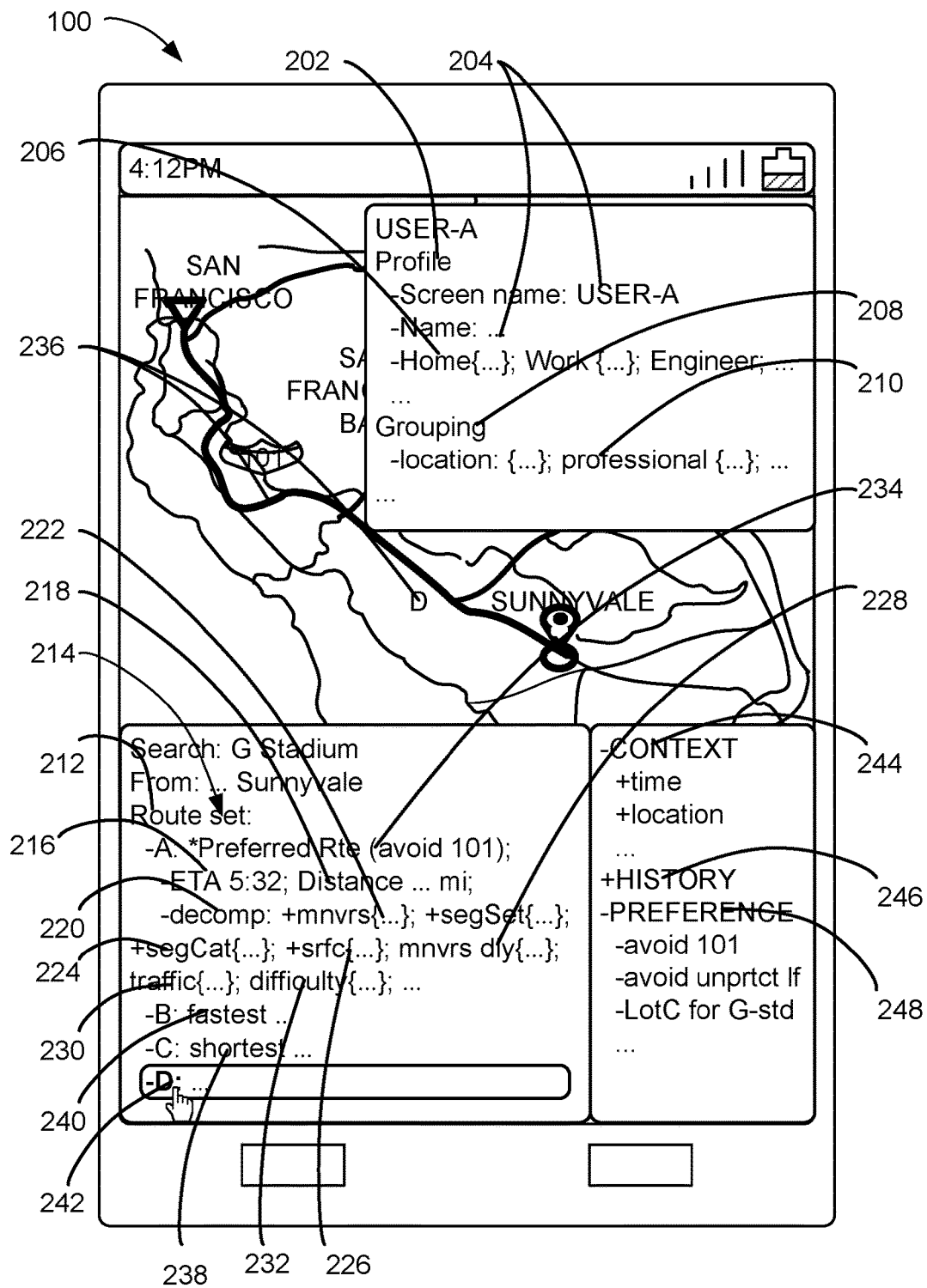
FIG. 2 is an example of a display interface of the navigation system.

Referring now to FIG. 2, therein is shown an example of a display interface of the navigation system 100. The navigation system 100 can include a user profile 202 corresponding to the system user 108 of FIG. 1, one or more of the further participants 110 of FIG. 1, or a combination thereof.

The user profile 202 is a description of the corresponding person, entity, or group known to the navigation system 100. The user profile 202 can include identification information, demographic description, professional information, social connections, a status, or a combination thereof of the corresponding party. For example, the user profile 202 can include user identification 204, user description 206, or a combination thereof.

The user identification 204 can include information for representing a uniqueness of the corresponding party. The user identification 204 can include information for recognizing the corresponding party, such as facial features for recognition, a log-in name, a password, or a combination thereof. The user identification 204 can further include a representation of the corresponding party, such as a screen name, an address to stored information representing or corresponding to the corresponding party, or a combination thereof.

The user description 206 can include information describing one or more aspects of the corresponding party, such as the system user 108, one or more of the further participants 110, or a combination thereof. The user description 206 can include demographic information, such as age or sex, locations of significance, such as home or work, professional information or title, or a combination thereof. The user description 206 can further include information such as vehicles owned or used by the corresponding party, estimated skill level, driving habits, or a combination thereof.

The user description 206 can further include relationship information, such as a social network, a connection between end users, such as between family or coworkers, or a combination thereof. For example, the user description 206 can identify the system user 108 as a working parent with ties or travel patterns corresponding to a location identified as 'home' and 'work'. The user description 206 can further identify the system user 108 having a particular title at a professional organization.

Continuing with the example, the user description 206 can further identify the system user 108 as a parent of one of the further participants 110 corresponding to same location identified as 'home' and a further location identified as 'school'. The navigation system 100 can identify the system user 108 as belonging to a category of the working parent based on the social connection to the one of the further participants 110, overlap in locations for 'home' and 'school', professional information, or a combination thereof.

The navigation system 100 can further include one or more instances of user grouping 208. The user grouping 208 can include a subset of the system user 108 and the further participants 110. The user grouping 208 can include one or more instances of the subset based on one or more commonalities shared by the members within the subset.

For example, the user grouping 208 can group people or entities with one or more of the further participants 110 based on similarities in the user profile 202. As a more specific example, the user grouping 208 can include one or more of the further participants 110 with similar demographics information, sharing locations of significance or within a threshold distance from each other, or a combination thereof. The user grouping 208 can further be based on system estimations, such as for skill level or preferences.

The user grouping 208 can include a correlated grouping 210. The correlated grouping 210 can include one or more instances of the user grouping 208 including the system user 108. The correlated grouping 210 can include one or more of the further participants 110 sharing a connection or a similarity with the system user 108.

The navigation system 100 can provide navigational features to the system user 108, the further participants 110, or a combination thereof. The navigation system 100 can present geographical information, guidance to a geographical location, search and identification of specific locations, or a combination thereof.

The navigation system 100 can generate a candidate route set 212 in providing the navigational features. The candidate route set 212 can include one or more instances of a candidate route 214 in response to an action of, an input from, a state of, or a combination thereof relative to an interfacing party, such as the system user 108 or one or more of the further participants 110. The candidate route set 212 can include a set of the candidate routes for presentation to the interfacing party, for selection by the interfacing party, or a combination thereof.

The candidate route 214 is a continuous path for traversing between geographic locations applicable to an input from the interfacing party. The candidate route 214 can include a path for traversing between a starting point to a destination. The candidate route 214 can include a potential route to be taken by the interfacing party.

The candidate route 214 can include a response to a query or a request from the interfacing party. The candidate route 214 can further include a hypothetical route for evaluating a relationship between a point of interest (POI) and the interfacing party, such as a distance or a likelihood of selection, or a combination thereof.

The candidate route 214 can correspond to an arrival time estimate 216, a candidate distance 218, a route decomposition profile 220, or a combination thereof. The candidate distance 218 can include a distance representation or measurement of the candidate route 214. The candidate distance 218 can be the amount of distance traversed by the system user 108 in following or traversing the candidate route 214. The navigation system 100 can calculate the candidate distance 218 based on map information, details regarding segments included in the candidate route 214, or a combination thereof.

The arrival time estimate 216 can include a calculated prediction of a time corresponding to arrival of a traveler at a specific corresponding location along the candidate route 214 or of a duration of travel necessary to reach the specific corresponding location. The arrival time estimate 216 can correspond to arrival of the system user 108 at one or more check points, the destination, or a combination thereof along the candidate route 214, traversal of one or more portions within the candidate route 214, or a combination thereof.

The navigation system 100 can calculate the arrival time estimate 216 based on historical data of traversals of the segment, an average speed of travel, a speed limit, or a combination thereof along one or more segments making up the candidate route 214. The navigation system 100 can calculate the arrival time estimate 216 based on historical data or the average speed using all users, a grouping of users including the user grouping 208, specific to the system user 108, or a combination thereof. The navigation system 100 can further calculate the arrival time estimate 216 based on the candidate distance 218 for the candidate route 214 or a portion therein.

The route decomposition profile 220 is a set of physical maneuvers required to follow or traverse the candidate route 214. The route decomposition profile 220 can include a maneuver, a segment, a condition or a characteristic thereof, a likely result or consequence thereof, an estimate or rating thereof, or a combination thereof. For example, the route decomposition profile 220 can include a segment set, a maneuver set 222, a segment category set 224, a segment surface condition 226, a maneuver delay time 228, a traffic density 230, maneuver difficulty rating 232, or a combination thereof.

The segment set can include a set of road paths or segments included in the corresponding instance of the candidate route 214. The segment set can include identification for a particular stretch of road path or segment, a node connecting the path or segment to another segment or path, or a combination thereof.

The segment set can include a number, a letter, a symbol, a street name, an address, a set of streets, or a combination thereof. For example, the segment set can include a serial number, a map element identifier, or a combination thereof corresponding to particular portions of a road or a path, an intersection connected thereto, or a combination thereof included in the candidate route 214. Also for example, the segment set can include a name of a path including the segment or path with a different name of a further path connecting or abutting the path.

The maneuver set 222 is a grouping of one or more specific manipulation of a vehicle, such as for changing direction of travel, acceleration or deceleration, lane change, stops, or a combination thereof associated with traversing or following the candidate route 214. The maneuver set 222 can include manipulations corresponding to map features, such as nodes, lanes, traffic signals or signs, curves, segment type, or a combination thereof. The maneuver set 222 can include instructions or guidance information for guiding the system user 108 to follow or traverse the candidate route 214.

The maneuver set 222 can include the maneuver corresponding to the segment set. For example, the maneuver set 222 can include a sequence of maneuvers, such as a turn, a lane change or a merge, a sourcing and ending segment, or a combination thereof necessary to traverse or follow the candidate route 214. As a more specific example, the maneuver set 222 can include the maneuver to be performed at an intersection or a particular instance of the segment or portion listed in the segment set in the necessary order corresponding to the candidate route 214.

The segment category set 224 is a set of descriptions, labels, or categorizations for representing each of the segments or path portions of the candidate route 214. The segment category set 224 can include descriptions or categorizations for the segments or paths included in the segment set.

For example, the segment category set 224 can include descriptions, labels, or categorizations such as 'freeway', 'highway', 'interstate', 'state road', 'city road', 'rural road', 'new development', 'overpass', 'underpass', 'bridge', or a combination thereof. Also for example, the segment category set 224 can include descriptions, labels, or categorizations based on number of lanes, number or type of access or ingress-egress points, direction of travel, or a combination thereof.

The segment surface condition 226 is a description or a representation of a characteristic, a condition, a state, a trait, a rating, or a combination thereof of the candidate route 214 affecting travel. The segment surface condition 226 can correspond to audible noise, a degree of comfort, or a combination thereof experienced by people traversing the corresponding instance of the segment or portion. The segment surface condition 226 can describe or represent a surface of travel including road surface for the segments or paths included in the segment set.

For example, the segment surface condition 226 can correspond to material of the road segment, irregularities in the surface, or a combination thereof. As a more specific example, the segment surface condition 226 can correspond to a number or a size of pot holes or bumps therein, a crack or an unevenness in the road, a duration or an age associated with the surface, or a combination thereof.

The maneuver delay time 228 is a representation of an amount of time associated with the specific manipulation required to follow or traverse the candidate route 214. The maneuver delay time 228 can include an estimate time or an average time people take to perform a particular corresponding maneuver at a particular location for the candidate route 214. The maneuver delay time 228 can correspond to a location, a maneuver, or a combination thereof in the maneuver set 222, the segment set, or a combination thereof.

The traffic density 230 is a representation of amount of vehicles, people, or a combination thereof for the candidate route 214 or a portion therein. The traffic density 230 can be based on historical data. The traffic density 230 can further be based on real-time data, such as for flow rate or speed of travelers. The navigation system 100 can determine the traffic density 230 for the route or a portion therein based on accessing a database including historical records, based on the current speed of the system user 108 or any of the further participants 110 currently traversing the segment or the route, or a combination thereof.

The maneuver difficulty rating 232 is a representation of an amount of care, attention, skill, or a combination thereof necessary to traverse the candidate route 214 or a portion therein. The maneuver difficulty rating 232 can include a value calculated to represent the amount of care, attention, skill, or a combination thereof. The maneuver difficulty rating 232 can be calculated based on a variety of factors.

For example, the maneuver difficulty rating 232 can be calculated based on a width of the segment or lanes therein, a number of lanes, a type of maneuver, a type of road as represented by the segment category set 224 or an instance therein, a degree of turn or change in direction, a slope of the road, a distance between maneuvers, a sequence thereof, or a combination thereof corresponding to the candidate route 214. Also for example, the maneuver difficulty rating 232 can be based on a number of vehicles or people or popularity as represented by the maneuver delay time 228 or the traffic density 230, a number or a rate of traffic accidents, visibility, ratings or reviews, or a combination thereof.

The candidate route set 212 can further include a preference-based route 234. The preference-based route 234 is an instance of the candidate route 214 generated based on or according to a preference or a pattern of the system user 108. The preference-based route 234 can be generated based on a behavior, a trace, a selection, a context thereof, or a combination thereof. The preference-based route 234 can be dynamically generated or updated from determining the user's preference using indirect information, without information or input directly identifying preferences of the system user 108, such as a survey or a query designed solely to determine the user's preference in routes and guidance.

The navigation system 100 can determine a selected route 236 based on a response or an input from the system user 108. The selected route 236 can include an instance of the candidate route 214 from the candidate route set 212 chosen by the system user 108 for traversing to the destination. The selected route 236 can represent the user's choice for a specific navigation session. The selected route 236 can be used to determine the preference of the system user 108 as it indirectly reflects or is chosen based on the preference of the system user 108 in routing or navigation.

The selected route 236 can be based on or from a default selection. The default selection is an instance of the candidate route 214 meeting a specific condition. The default selection can include an instance of the candidate route 214 highlighted by the navigation system 100. The default selection can include an instance of the candidate route 214 with the selection cursor placed thereon. The default selection can further include an instance of the candidate route 214 listed or displayed at a top or a center of the candidate route set 212.

The default selection can be determined based on a category, a condition, a trait, a characteristic, or a combination thereof of the candidate route 214. For example, the default selection can include an efficiency-based choice, such as a shortest route 238, a fastest route 240, or a combination thereof. Also for example, the default selection can include the preference-based route 234.

The shortest route 238 can include an instance of the candidate route 214 with shortest total travel distance needed to arrive at the destination from amongst the candidates within the candidate route set 212. The fastest route 240 is can include an instance of the candidate route 214 with shortest estimated total travel time needed to arrive at the destination from amongst the candidates within the candidate route set 212.

The selected route 236 can further be based on or from a non-default selection 242. The non-default selection 242 is an instance of the candidate route 214 separate from the default selection. The non-default selection 242 can include a non-efficient selection. The non-default selection 242 can include an instance of the candidate route 214 separate from efficiency-based choice, such as the shortest route 238 or the fastest route 240, separate from the preference-based route 234, or a combination thereof.

The non-default selection 242 can include the selected route 236 that is not the shortest route 238, that is not the fastest route 240, that is not the preference-based route 234, or a combination thereof as estimated by the navigation system 100. The navigation system 100 can use the non-default selection 242 and conditions or circumstances associated thereto to determine the preference of the system user 108.

The navigation system 100 can determine one or more contextual parameters 244 associated with the user selections. The contextual parameters 244 can include a representation of a situation, an environment, a purpose, a significance, or a combination thereof regarding geographical movement or travel of an end user. The contextual parameters 244 include data or information associated with or relevant to the system user 108, the candidate route set 212, the selected route 236, or a combination thereof. Details regarding the contextual parameters 244 are discussed below.

The navigation system 100 can store the contextual parameters 244, the selected route 236, the candidate route set 212, or a combination thereof in user history 246. The user history 246 can include a record of the previously occurring instances of the geographical movement or travel.

The user history 246 can include previous instances of free-drive session without utilizing navigation or guidance feature of the navigation system 100. The user history 246 can further include previous instances of the navigation session. For example, the user history 246 can include a vehicle trace, the selected route 236, the candidate route set 212 corresponding to the selected route 236, the contextual parameters 244 associated with the user's travel, or a combination thereof.

The navigation system 100 can access the user history 246, the selected route 236 in real-time, or a combination thereof to generate a user preference profile 248. The navigation system 100 can generate the user preference profile 248 based on the selected route 236, the contextual parameters 244, the candidate route set 212, or a combination thereof.

The user preference profile 248 is a representation of the navigation or guidance preference of a corresponding end user. The user preference profile 248 can include a description of particular characteristics or traits desired by the system user 108. The user preference profile 248 can further include a scenario or a condition associated with or dictating specific preferences of the system user 108.

For example, the user preference profile 248 can include a maneuver, a segment, a type thereof, a consequence thereof, such as a delay or a scenic route, a difficulty level, a brand, a leisure enjoyment, or a combination thereof preferred by the system user 108 to be included or avoided in routes for the system user 108. Also for example, the user preference profile 248 can include a scenario or a condition associated with urgency or importance of arriving at the destination, a group of traveling partners, familiarity, skill level of the user, time of day, or a combination thereof affecting the preference of the system user 108. Details regarding the user preference profile 248 are discussed below.

Figure 3:
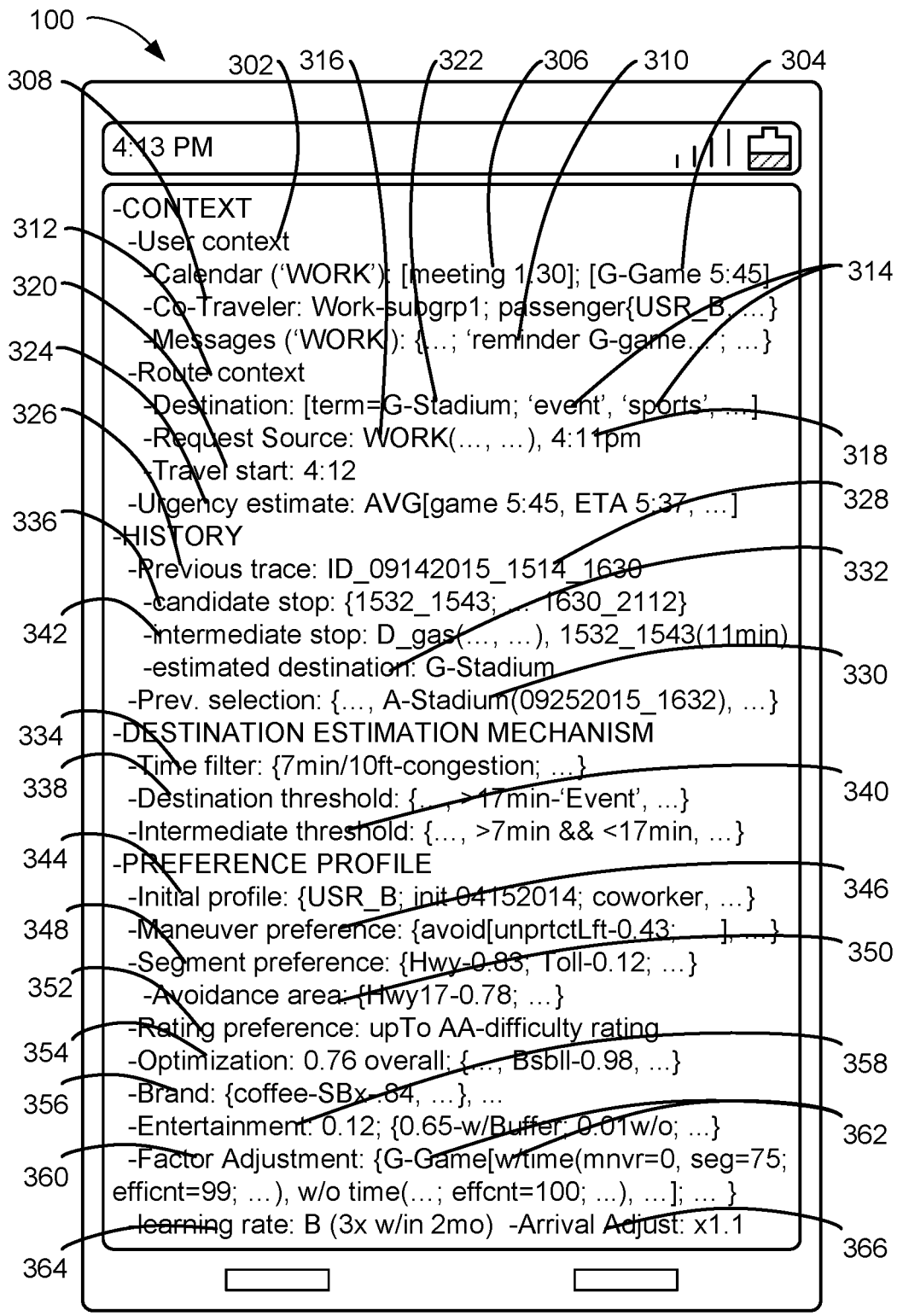
FIG. 3 is a further example of the display interface of the navigation system.

Referring now to FIG. 3, therein is shown a further example of the display interface of the navigation system 100. The display interface can show details for the contextual parameters 244 of FIG. 2, the user history 246 of FIG. 2, the user preference profile 248 of FIG. 2, or a combination thereof. The contextual parameters 244 can include one or more parameters or representations for a user context 302, a route context 312, an urgency estimate 324, or a combination thereof.

The user context 302 can include a representation of a situation, an environment, a purpose, a significance, or a combination thereof concerning the system user 108 of FIG. 1. The user context 302 can be from a perspective from the system user 108. The user context 302 can include a parameter, a label, a summary, or a combination thereof representing or characteristic of a situation or a scenario from the perspective of the system user 108 without directly describing the corresponding route, such as the selected route 236 of FIG. 2 or a traveled route.

For example, the user context 302 can include a subsequent event 304, a preceding event 306, a passenger set 308, a user message set 310, or a combination thereof. The subsequent event 304 can include a happening or an occurrence associated with a time subsequent to a time associated with a corresponding route.

The subsequent event 304 can include an event scheduled to occur or start after estimated arrival of the system user 108 at the destination, after current time, after starting travel on the route, after requesting the route, or a combination thereof. The subsequent event 304 can further be associated with a corresponding route such as the candidate route 214 of FIG. 2, the selected route 236, previously traveled route or trace, or a combination thereof.

The preceding event 306 can include a happening or an occurrence associated with a time associated with a corresponding route with a time previous to a time associated with a corresponding route. The preceding event 306 can be similar in description to the subsequent event 304 but for occurring after the time.

For example, the preceding event 306 can include event scheduled to occur or start before estimated arrival of the system user 108 at the destination, before current time, before starting travel on the route, before requesting the route, or a combination thereof. Also for example, the preceding event 306 can further be associated with a corresponding route such as the candidate route 214, the selected route 236, previously traveled route or trace, or a combination thereof.

The passenger set 308 can include a group of people or the further participants 110 of FIG. 1 accompanying the corresponding end user. The passenger set 308 can include one or more people located within a vehicle along with the system user 108. The passenger set 308 can further include one or more people traveling to the same destination, sharing the same route, attending the same instance of the subsequent event 304, coming from the same instance of the preceding event 306, having previous contact or a connection with the system user 108, or a combination thereof.

The user message set 310 can include correspondences associated with a particular user, such as for emails, text messages, phone calls, video chats, or a combination thereof. For example, the user message set 310 can include an inbox, a sent box, deleted messages, correspondences therein, or a combination thereof. Also for example, the user message set 310 can include a call log. Also for example, the user message set 310 can include tags or categories thereof, metadata or context information, or a combination thereof for the messages.

The route context 312 can include a representation of a situation, an environment, a purpose, a significance, or a combination thereof concerning a route. The route context 312 can be from a perspective of a route or a navigation session for the system user 108. The route context 312 can directly describe or represent the selected route 236, previous trace, the destination, the candidate route set 212 of FIG. 2, or a combination thereof.

The route context 312 can be similar to the user context 302 but for a different perspective or category or information. The route context 312 can include a parameter, a label, a summary, or a combination thereof representing or characteristic of a situation or a scenario from the perspective of the navigation session without directly describing the corresponding traveler. For example, the route context 312 can include a destination category 314, a request sourcing location 316, a request time 318, a travel initiation time 320, a search term 322, or a combination thereof.

The destination category 314 can include a label or a categorization for the destination associated with the candidate route 214. The destination category 314 can describe the destination sought by the system user 108. For example, the destination category 314 can include 'professional', 'personal', 'social', 'place of business', 'home', 'place of work', 'restaurant', or a combination thereof. Also for example, the destination category 314 can be based on familiarity of or a number of previous visits to the destination by the system user 108.

The request sourcing location 316 can include a geographical location or an entity associated with the geographic location of the system user 108 at the time of requesting navigation or guidance. The request sourcing location 316 can be the location corresponding to the system user 108 searching for a POI, requesting a route to a destination, or a combination thereof using the navigation system 100.

The request time 318 can include a time of request for navigation or guidance by the system user 108. The request time 318 can be similar to the request sourcing location 316 but regarding time instead of location. The request time 318 can be the time corresponding to the system user 108 submitting a search request for a POI, a route request to a destination, or a combination thereof using the navigation system 100.

The travel initiation time 320 can include a time the system user 108 starts traveling the selected route 236 or the previously traveled trace. The travel initiation time 320 can be the time the system user 108 selects the candidate route 214 to be the selected route 236. The travel initiation time 320 can further correspond to the time the system user 108 leaves the preceding event 306, a specific location, or a combination thereof.

The search term 322 can include a letter, a number, a symbol, or a combination thereof from the system user 108 looking for a POI or a route. The search term 322 can include a name, a title, a keyword, or a combination thereof provided by the system user 108 as input to the navigation system 100. The search term 322 can be for initiating search for a POI, a route to a destination, a product, an item, a person or a name associated with a location, an address, or a combination thereof.

The urgency estimate 324 can include a representation of calculated or predicted seriousness, importance, desperation, pressure, or a combination thereof. The urgency estimate 324 can be estimated by the navigation system 100 in relation to arriving at the destination, traversing the selected route 236, traversing the previous trace, or a combination thereof. The navigation system 100 can determine the urgency estimate 324 based on driving pattern, such as accelerometer reading or travel speed relative to limits, based on the contextual parameters 244, or a combination thereof.

The user history 246 can include a previous trace 326 corresponding to a time marker 328, a previous selection 330, or a combination thereof. The previous trace 326 is a set of linked geographic locations representing a path previously traversed by the system user 108 without utilizing navigation guidance or a system-provided route.

The navigation system 100 can track the location of the system user 108 during a free-drive mode, where the system user 108 travels without utilizing the selected route 236 and without utilizing any navigational features from the navigation system 100. The navigation system 100 can record the current location or corresponding coordinate information of the system user 108 on a periodic basis. The navigation system 100 can identify a set of the recorded coordinates as the previous trace 326.

One or more of the coordinates within the previous trace 326 can correspond to the time marker 328. The time marker 328 is an indication of the time of recordation of the geographic location within the previous trace 326. The navigation system 100 can record the current time along with the current location for the previous trace 326. The navigation system 100 can use the time marker 328 in identifying the previous trace 326.

The previous selection 330 can include prior instances of the selected route 236. The previous selection 330 can include the routes selected by the system user 108 from previous searches or requests. The navigation system 100 can store the address, the route, an identifier thereof, a compressed summary thereof, or a combination thereof each time the system user 108 selects the selected route 236. The navigation system 100 can store the selected route 236 along with the current time of the selection.

The navigation system 100 can determine a destination estimate 332. The destination estimate 332 is a prediction or an approximation of the destination for a travel session. The destination estimate 332 can correspond to the destination of a current or a previously occurring free-drive session. The destination estimate 332 can be determined based on the contextual parameters 244, from the user history 246, or a combination thereof. The destination estimate 332 can further be associated with identifying the previous trace 326.

The navigation system 100 can determine the destination estimate 332 using a time filter 334, a candidate stop 336, a destination time threshold 338, an intermediate time threshold 340, an intermediate stop 342, or a combination thereof. The time filter 334 is a mechanism for removing unqualified stops based on a duration of the stops. The time filter 334 can be implemented in hardware or software. The time filter 334 can be based on a threshold time corresponding to the duration of the stops.

The candidate stop 336 is a location occupied by the system user 108 for longer than the threshold of the time filter 334. The candidate stop 336 can correspond to a location where the system user 108 stops or had stopped for a sufficient amount of time as required by the time filter 334.

The destination time threshold 338 is an amount of time or duration used to identify the destination estimate 332. The navigation system 100 can determine the destination estimate 332 by identify the candidate stop 336 as the destination estimate 332 when the duration of stay by the system user 108 at the candidate stop 336 exceeds the destination time threshold 338.

The intermediate time threshold 340 is an amount of time or duration used to identify the intermediate stop 342. The intermediate time threshold 340, the destination time threshold 338, or a combination thereof can be used to distinguish the destination estimate 332 and the intermediate stop 342. The navigation system 100 can determine the intermediate stop 342 when the duration of stay by the system user 108 at the candidate stop 336 exceeds the intermediate time threshold 340, is below the destination time threshold 338, or a combination thereof.

The intermediate stop 342 is a location occupied by the system user 108 in travelling to a destination. The intermediate stop 342 can include the location associated with a task or an errand. The intermediate stop 342 can facilitate the travel to the destination. For example, the intermediate stop 342 can include a stop at the gas station, at the grocery store, or a combination thereof while travelling to the destination.

The navigation system 100 can include the destination time threshold 338 predetermined and greater than the intermediate time threshold 340. The navigation system 100 can further include the intermediate time threshold 340 predetermined and greater than the time filter 334. The navigation system 100 can further include the destination time threshold 338, the intermediate time threshold 340, the time filter 334, or a combination thereof adaptive based on various factors.

For example, the destination time threshold 338, the intermediate time threshold 340, the time filter 334, or a combination thereof can correspond to an average duration of a traffic signal, a merging maneuver, a traffic delay scenario, a gasoline refill, wait time at an establishment, an average grocery stop associated with the destination, or a combination thereof. Also for example, the destination time threshold 338, the intermediate time threshold 340, the time filter 334, or a combination thereof can be adjusted based on the destination estimate 332, a relative location, the contextual parameters 244, or a combination thereof.

As a more specific example, the destination time threshold 338, the intermediate time threshold 340, the time filter 334, or a combination thereof can be adapted based on a time of day, a current location, a number of vehicles within common road segment or establishment, an average speed within the common road segment or the establishment, the passenger set 308, or a combination thereof. Also as a more specific example, the destination time threshold 338, the intermediate time threshold 340, the time filter 334, or a combination thereof can be adjusted based on keywords within the user message set 310, a calendar of the system user 108, or a combination thereof.

The user preference profile 248 can be generated using an initial profile 344. The initial profile 344 is a representative set of preferences attributed to an end user. The initial profile 344 can initially represent the system user 108. The initial profile 344 can be a starting point for generating and updating the user preference profile 248. The initial profile 344 can be based on one or more inputs from the system user 108 for directly identifying one or more preferences of the system user 108.

The initial profile 344 can also be based on other end users sharing similarities with the system user 108. For example, the initial profile 344 can be the user preference profile 248, a portion therein, an average thereof, or a combination thereof corresponding to one or more of the further participants 110 of FIG. 1 with the user profile 202 of FIG. 2 or a portion therein matching the system user 108. As a more specific example, the initial profile 344 can be generated from one or more of the further participants 110 with overlapping travel areas, same demographics information, same place of work or home, same class or category of vehicles, similarities in routes, commonalities within the user history 246, or a combination thereof.

The user preference profile 248 can include a maneuver preference 346, a segment preference 348 such as including an avoidance area 350, a rating preference 352, an optimization preference 354, a brand preference 356, an entertainment preference 358, or a combination thereof. The maneuver preference 346 is a representation of one or more maneuvers favored or disfavored by the corresponding end user.

The maneuver preference 346 can correspond to a particular physical or geographical movement for the system user 108, a vehicle, or a combination thereof. For example, the maneuver preference 346 can include a preference of the system user 108 to favor or avoid a 'right turn', a 'u-turn', a 'left-turn', an 'unprotected turn', a 'reverse', a 'parallel parking', a 'merge', a 'yield', or a combination thereof.

The segment preference 348 is a representation of one or more road segments, edges, paths, or a combination thereof favored or disfavored by the corresponding end user. The segment preference 348 can include one or more types or categories corresponding to the segment category set 224 of FIG. 2. For example, the segment preference 348 can include a 'highway', a 'freeway', an 'expressway', a 'loop', a 'toll-road', a 'rural road', a 'one-way', a 'roundabout', an 'interchange', a 'bridge', an 'overpass', a 'tunnel', an 'underground passage', a 'rural road', or a combination thereof.

The segment preference 348 can further include one or more types or categories corresponding to the segment surface condition 226 of FIG. 2. The segment preference 348 can further include the avoidance area 350 representing a specific geographic location disfavored or avoided by the system user 108. The avoidance area 350 can include a specific intersection, a specific area, a specific stretch of road or segment, or a combination thereof. For example, the avoidance area 350 can include a street abutting a stadium or a shopping mall, a specific section of a particular freeway, a specific toll gate, or a combination thereof.

The rating preference 352 is a representation of a comfort level of the corresponding end user associated with a skill level or an amount of attention necessary with traversing or following certain paths or segments. The rating preference can include a particular level or value of the maneuver difficulty rating 232 of FIG. 2 favored or avoided by the end user.

The rating preference 352 can indicate a comfort level associated with the system user 108 for utilizing or traversing segments or paths at or below the particular level or value of the maneuver difficulty rating 232. For example, the rating preference 352 can indicate the comfort level of the system user 108 relative to a curvy mountain road, a particular weather condition, freeway or high-speed traveling, dealing with pedestrians or heavy traffic situation, or a combination thereof.

The optimization preference 354 is a representation of a propensity of an end user to favor the efficient route over other choices or factors. The optimization preference 354 can represent a likelihood that the system user 108 will choose the shortest route 238 of FIG. 2, the fastest route 240 of FIG. 2, or a combination thereof. The optimization preference 354 can further represent a likelihood that the system user 108 will choose the non-default selection 242 of FIG. 2 or the inefficient route over the default selection or the efficient route. The optimization preference 354 can indicate a pattern or a preference of the system user 108 to disregard efficiency in time or resources in favor of other factors or parameters.

The brand preference 356 is a representation of a specific source of goods or services favored or disfavored by the end user. The brand preference 356 can represent a particular interest, either positive or negative, of the system user 108 for a specific company, group, establishment, or a combination thereof corresponding to POIs. For example, the brand preference 356 can correspond to a specific coffee brand, a certain store or restaurant, a particular chain of health clubs, or a combination thereof favored or avoided by the system user 108.

The entertainment preference 358 is a representation of a propensity of an end user to favor factors associated with enjoyment or pleasure. The entertainment preference 358 can include the propensity of the system user 108 to select a path or a segment known or classified as 'scenic route', 'historical route', a route including a popular location or a historical site, or a combination thereof.

The entertainment preference 358 can correspond to audible or visual content, such as a radio show or a documentary, accessed before, during, or after the traversal of the path or the segment corresponding to the content. The entertainment preference 358 can correspond to a social relationship or a personal significance. For example, the entertainment preference 358 can correspond to information the system user 108 shared on social networking sites, such as a location associated with a highly rated or enjoyed activity, an activity with significant meaning, or a combination thereof. Also for example, the entertainment preference 358 can correspond to the passenger set 308, such as common previous experience or a shared interest.

The various preferences for the user preference profile 248 can be dynamic or adaptive to various other factors. For example, one or more of the preference or an importance thereof can be changed based on the contextual parameters 244 or the situation, such as based on time, location, the passenger set 308, the preceding event 306, the subsequent event 304, the destination category 314, sourcing of the request, or a combination thereof.

The user preference profile 248 can further include a factor adjustment set 360 corresponding to parameter condition 362. The factor adjustment set 360 is a mechanism for dynamically adjusting the one or more of the preference or the importance thereof based on the situation to reflect the comprehensive preference of the corresponding end user. The factor adjustment set 360 can include a set of weights, cases or scenarios, an equation, a method or a process, or a combination thereof for adjusting and combining the various preferences within the user preference profile 248.

The factor adjustment set 360 can control contribution of the initial profile 344, the maneuver preference 346, the segment preference 348, the rating preference 352, the optimization preference 354, the brand preference 356, the entertainment preference 358, or a combination thereof in generating the preference-based route 234 of FIG. 2 corresponding to the current situation or context of the system user 108. The parameter condition 362 is a representation of specific scenarios or conditions of the corresponding end user dictating the change or particular combination of the preferences.

The parameter condition 362 can correspond to the cases or scenarios, inputs or controlling factors, or a combination thereof for dictating a specific combination of weights or importance for specific preferences. The parameter condition 362 can correspond to one or more sets of particular combination or value of the contextual parameters 244. The parameter condition 362 can be the qualifier or the condition statement for implementing a certain set of weight or a specific equation. The parameter condition 362 can correspond to "if" or "when" condition for implementing the factor adjustment set 360 corresponding to "then" or the applicable implementation.

The user preference profile 248 can further include a road-learning rate 364, an arrival-time adjustment 366, or a combination thereof. The road-learning rate 364 can be a representation of the corresponding end user's ability to learn and remember physical surroundings or paths. The road-learning rate 364 can correspond to a number of times or a frequency in requesting navigational guidance for a particular destination. The road-learning rate 364 can correspond to a number of times or a duration between navigational or search request for the same location before traveling unassisted to the same location.

The arrival-time adjustment 366 is a representation of an end user's driving rate. The arrival-time adjustment 366 can correspond to a pattern in traveling time for the system user 108 relative to a calculated time of travel or arrival time. The arrival-time adjustment 366 can include a personalization factor for the estimated time of arrival specific to a driving habit or a pattern of the system user 108.

The navigation system 100 can generate the user preference profile 248 or a component therein based on the user history 246. The navigation system 100 can generate the user preference profile 248 based on the non-default selection 242, the contextual parameters 244, or a combination thereof. The navigation system 100 can further generate the user preference profile 248 based on the comparing or contrasting the non-default selection 242 with the default selection. The navigation system 100 can use a pattern analysis mechanism, a machine-learning mechanism, a predetermined method or process, or a combination thereof to generate the user preference profile 248. Details regarding generation of the user preference profile 248 are discussed below.

Figure 4:
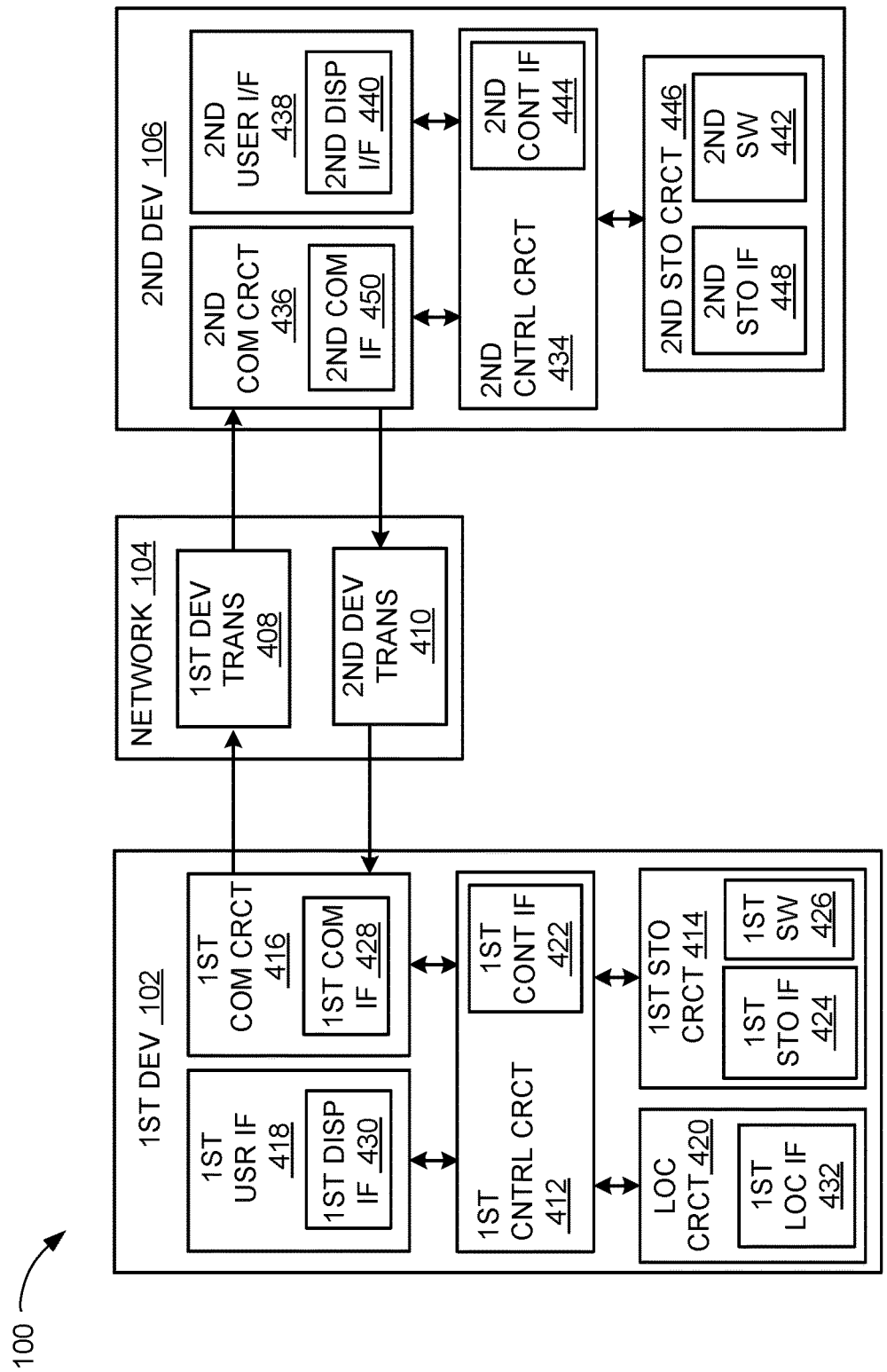
FIG. 4 is an exemplary block diagram of the navigation system.

Referring now to FIG. 4, therein is shown an exemplary block diagram of the navigation system 100. The navigation system 100 can include the first device 102, the network 104, and the second device 106. The first device 102 can send information in a first device transmission 408 over the network 104 to the second device 106. The second device 106 can send information in a second device transmission 410 over the network 104 to the first device 102.

For illustrative purposes, the navigation system 100 is shown with the first device 102 as a client device, although it is understood that the navigation system 100 can have the first device 102 as a different type of device. For example, the first device 102 can be a server having a display interface.

Also for illustrative purposes, the navigation system 100 is shown with the second device 106 as a server, although it is understood that the navigation system 100 can have the second device 106 as a different type of device. For example, the second device 106 can be a client device.

For brevity of description in this embodiment of the present invention, the first device 102 will be described as a client device and the second device 106 will be described as a server device. The embodiment of the present invention is not limited to this selection for the type of devices. The selection is an example of an embodiment of the present invention.

The first device 102 can include a first control circuit 412, a first storage circuit 414, a first communication circuit 416, and a first user interface 418, and a location circuit 420. The first control circuit 412 can include a first control interface 422. The first control circuit 412 can execute a first software 426 to provide the intelligence of the navigation system 100.

The first control circuit 412 can be implemented in a number of different manners. For example, the first control circuit 412 can be a processor, an application specific integrated circuit (ASIC) an embedded processor, a microprocessor, a hardware control logic, a hardware finite state machine (FSM), a digital signal processor (DSP), or a combination thereof. The first control interface 422 can be used for communication between the first control circuit 412 and other functional units or circuits in the first device 102. The first control interface 422 can also be used for communication that is external to the first device 102.

The first control interface 422 can receive information from the other functional units/circuits or from external sources, or can transmit information to the other functional units/circuits or to external destinations. The external sources and the external destinations refer to sources and destinations external to the first device 102.

The first control interface 422 can be implemented in different ways and can include different implementations depending on which functional units/circuits or external units/circuits are being interfaced with the first control interface 422. For example, the first control interface 422 can be implemented with a pressure sensor, an inertial sensor, a microelectromechanical system (MEMS), optical circuitry, waveguides, wireless circuitry, wireline circuitry, or a combination thereof.

The first storage circuit 414 can store the first software 426. The first storage circuit 414 can also store the relevant information, such as data representing incoming images, data representing previously presented image, sound files, or a combination thereof.

The first storage circuit 414 can be a volatile memory, a nonvolatile memory, an internal memory, an external memory, or a combination thereof. For example, the first storage circuit 414 can be a nonvolatile storage such as non-volatile random access memory (NVRAM), Flash memory, disk storage, or a volatile storage such as static random access memory (SRAM).

The first storage circuit 414 can include a first storage interface 424. The first storage interface 424 can be used for communication between the first storage circuit 414 and other functional units or circuits in the first device 102. The first storage interface 424 can also be used for communication that is external to the first device 102.

The first storage interface 424 can receive information from the other functional units/circuits or from external sources, or can transmit information to the other functional units/circuits or to external destinations. The external sources and the external destinations refer to sources and destinations external to the first device 102.

The first storage interface 424 can include different implementations depending on which functional units/circuits or external units/circuits are being interfaced with the first storage circuit 414. The first storage interface 424 can be implemented with technologies and techniques similar to the implementation of the first control interface 422.

The first communication circuit 416 can enable external communication to and from the first device 102. For example, the first communication circuit 416 can permit the first device 102 to communicate with the second device 106 of FIG. 1, an attachment, such as a peripheral device or a desktop computer, and the network 104.

The first communication circuit 416 can also function as a communication hub allowing the first device 102 to function as part of the network 104 and not limited to be an end point or terminal circuit to the network 104. The first communication circuit 416 can include active and passive components, such as microelectronics or an antenna, for interaction with the network 104.

The first communication circuit 416 can include a first communication interface 428. The first communication interface 428 can be used for communication between the first communication circuit 416 and other functional units or circuits in the first device 102. The first communication interface 428 can receive information from the other functional units/circuits or can transmit information to the other functional units or circuits.

The first communication interface 428 can include different implementations depending on which functional units or circuits are being interfaced with the first communication circuit 416. The first communication interface 428 can be implemented with technologies and techniques similar to the implementation of the first control interface 422.

The first user interface 418 allows a user (not shown) to interface and interact with the first device 102. The first user interface 418 can include an input device and an output device. Examples of the input device of the first user interface 418 can include a keypad, a touchpad, soft-keys, a keyboard, a microphone, an infrared sensor for receiving remote signals, or any combination thereof to provide data and communication inputs.

The first user interface 418 can include a first display interface 430. The first display interface 430 can include an output device. The first display interface 430 can include a display, a projector, a video screen, a speaker, or any combination thereof.

The first control circuit 412 can operate the first user interface 418 to display information generated by the navigation system 100. The first control circuit 412 can also execute the first software 426 for the other functions of the navigation system 100, including receiving location information from the location circuit 420. The first control circuit 412 can further execute the first software 426 for interaction with the network 104 via the first communication circuit 416.

The location circuit 420 can generate location information, current heading, current acceleration, and current speed of the first device 102, as examples. The location circuit 420 can be implemented in many ways. For example, the location circuit 420 can function as at least a part of the global positioning system, an inertial navigation system, a cellular-tower location system, a pressure location system, or any combination thereof. Also, for example, the location circuit 420 can utilize components such as an accelerometer or global positioning system (GPS) receiver.

The location circuit 420 can include a first location interface 432. The first location interface 432 can be used for communication between the location circuit 420 and other functional units or circuits in the first device 102. The first location interface 432 can also be used for communication external to the first device 102.

The first location interface 432 can receive information from the other functional units/circuits or from external sources, or can transmit information to the other functional units/circuits or to external destinations. The external sources and the external destinations refer to sources and destinations external to the first device 102.

The first location interface 432 can include different implementations depending on which functional units/circuits or external units/circuits are being interfaced with the location circuit 420. The first location interface 432 can be implemented with technologies and techniques similar to the implementation of the first control circuit 412.

The second device 106 can be optimized for implementing an embodiment of the present invention in a multiple device embodiment with the first device 102. The second device 106 can provide the additional or higher performance processing power compared to the first device 102. The second device 106 can include a second control circuit 434, a second communication circuit 436, a second user interface 438, and a second storage circuit 446.

The second user interface 438 allows a user (not shown) to interface and interact with the second device 106. The second user interface 438 can include an input device and an output device. Examples of the input device of the second user interface 438 can include a keypad, a touchpad, softkeys, a keyboard, a microphone, or any combination thereof to provide data and communication inputs. Examples of the output device of the second user interface 438 can include a second display interface 440. The second display interface 440 can include a display, a projector, a video screen, a speaker, or any combination thereof.

The second control circuit 434 can execute a second software 442 to provide the intelligence of the second device 106 of the navigation system 100. The second software 442 can operate in conjunction with the first software 426. The second control circuit 434 can provide additional performance compared to the first control circuit 412.

The second control circuit 434 can operate the second user interface 438 to display information. The second control circuit 434 can also execute the second software 442 for the other functions of the navigation system 100, including operating the second communication circuit 436 to communicate with the first device 102 over the network 104.

The second control circuit 434 can be implemented in a number of different manners. For example, the second control circuit 434 can be a processor, an embedded processor, a microprocessor, hardware control logic, a hardware finite state machine (FSM), a digital signal processor (DSP), or a combination thereof.

The second control circuit 434 can include a second control interface 444. The second control interface 444 can be used for communication between the second control circuit 434 and other functional units or circuits in the second device 106. The second control interface 444 can also be used for communication that is external to the second device 106.

The second control interface 444 can receive information from the other functional units/circuits or from external sources, or can transmit information to the other functional units/circuits or to external destinations. The external sources and the external destinations refer to sources and destinations external to the second device 106.

The second control interface 444 can be implemented in different ways and can include different implementations depending on which functional units/circuits or external units/circuits are being interfaced with the second control interface 444. For example, the second control interface 444 can be implemented with a pressure sensor, an inertial sensor, a microelectromechanical system (MEMS), optical circuitry, waveguides, wireless circuitry, wireline circuitry, or a combination thereof.

A second storage circuit 446 can store the second software 442. The second storage circuit 446 can also store the information such as data representing incoming images, data representing previously presented image, sound files, or a combination thereof. The second storage circuit 446 can be sized to provide the additional storage capacity to supplement the first storage circuit 414.

For illustrative purposes, the second storage circuit 446 is shown as a single element, although it is understood that the second storage circuit 446 can be a distribution of storage elements. Also for illustrative purposes, the navigation system 100 is shown with the second storage circuit 446 as a single hierarchy storage system, although it is understood that the navigation system 100 can have the second storage circuit 446 in a different configuration. For example, the second storage circuit 446 can be formed with different storage technologies forming a memory hierarchal system including different levels of caching, main memory, rotating media, or off-line storage.

The second storage circuit 446 can be a volatile memory, a nonvolatile memory, an internal memory, an external memory, or a combination thereof. For example, the second storage circuit 446 can be a nonvolatile storage such as non-volatile random access memory (NVRAM), Flash memory, disk storage, or a volatile storage such as static random access memory (SRAM).

The second storage circuit 446 can include a second storage interface 448. The second storage interface 448 can be used for communication between the second storage circuit 446 and other functional units or circuits in the second device 106. The second storage interface 448 can also be used for communication that is external to the second device 106.

The second storage interface 448 can receive information from the other functional units/circuits or from external sources, or can transmit information to the other functional units/circuits or to external destinations. The external sources and the external destinations refer to sources and destinations external to the second device 106.

The second storage interface 448 can include different implementations depending on which functional units/circuits or external units/circuits are being interfaced with the second storage circuit 446. The second storage interface 448 can be implemented with technologies and techniques similar to the implementation of the second control interface 444.

The second communication circuit 436 can enable external communication to and from the second device 106. For example, the second communication circuit 436 can permit the second device 106 to communicate with the first device 102 over the network 104.

The second communication circuit 436 can also function as a communication hub allowing the second device 106 to function as part of the network 104 and not limited to be an end point or terminal unit or circuit to the network 104. The second communication circuit 436 can include active and passive components, such as microelectronics or an antenna, for interaction with the network 104.

The second communication circuit 436 can include a second communication interface 450. The second communication interface 450 can be used for communication between the second communication circuit 436 and other functional units or circuits in the second device 106. The second communication interface 450 can receive information from the other functional units/circuits or can transmit information to the other functional units or circuits.

The second communication interface 450 can include different implementations depending on which functional units or circuits are being interfaced with the second communication circuit 436. The second communication interface 450 can be implemented with technologies and techniques similar to the implementation of the second control interface 444.

The first communication circuit 416 can couple with the network 104 to send information to the second device 106 in the first device transmission 408. The second device 106 can receive information in the second communication circuit 436 from the first device transmission 408 of the network 104.

The second communication circuit 436 can couple with the network 104 to send information to the first device 102 in the second device transmission 410. The first device 102 can receive information in the first communication circuit 416 from the second device transmission 410 of the network 104. The navigation system 100 can be executed by the first control circuit 412, the second control circuit 434, or a combination thereof. For illustrative purposes, the second device 106 is shown with the partition having the second user interface 438, the second storage circuit 446, the second control circuit 434, and the second communication circuit 436, although it is understood that the second device 106 can have a different partition. For example, the second software 442 can be partitioned differently such that some or all of its function can be in the second control circuit 434 and the second communication circuit 436. Also, the second device 106 can include other functional units or circuits not shown in FIG. 4 for clarity.

The functional units or circuits in the first device 102 can work individually and independently of the other functional units or circuits. The first device 102 can work individually and independently from the second device 106 and the network 104.

The functional units or circuits in the second device 106 can work individually and independently of the other functional units or circuits. The second device 106 can work individually and independently from the first device 102 and the network 104.

The functional units or circuits described above can be implemented in hardware. For example, one or more of the functional units or circuits can be implemented using the a gate, circuitry, a processor, a computer, integrated circuit, integrated circuit cores, a pressure sensor, an inertial sensor, a microelectromechanical system (MEMS), a passive device, a physical non-transitory memory medium having instructions for performing the software function, a portion therein, or a combination thereof.

For illustrative purposes, the navigation system 100 is described by operation of the first device 102 and the second device 106. It is understood that the first device 102 and the second device 106 can operate any of the modules and functions of the navigation system 100.

Figure 5:
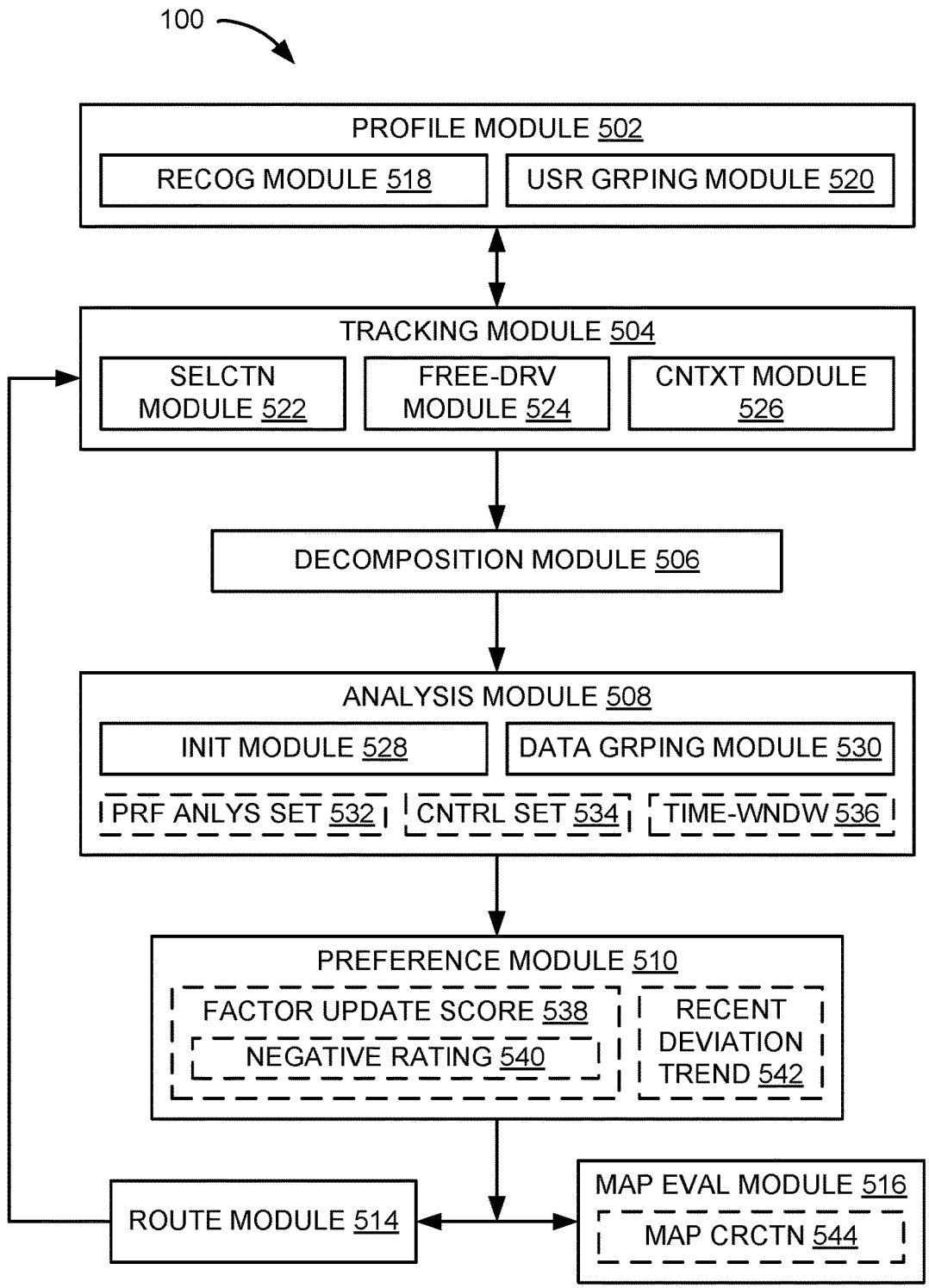
FIG. 5 is a control flow of the navigation system.

Referring now to FIG. 5, therein is shown a control flow of the navigation system 100. The navigation system 100 can include a profile module 502, a tracking module 504, a decomposition module 506, an analysis module 508, a preference module 510, a route module 514, a map evaluation module 516, or a combination thereof.

The profile module 502 can be coupled to the tracking module 504. The tracking module 504 can be coupled to the decomposition module 506. The decomposition module 506 can be coupled to the analysis module 508. The analysis module 508 can be coupled to the preference module 510, which can be further coupled to the route module 514, the map evaluation module 516, or a combination thereof. The route module 514 can be further coupled to the tracking module 504.

The modules can be coupled using wired or wireless connections, by having an output of one module as an input of the other module, by having operations of one module influence operation of the other module, or a combination thereof. The modules can be directly coupled with no intervening structures or objects other than the connector there-between, or indirectly coupled.

The profile module 502 is configured to identify one or more end users of the navigation system 100. The profile module 502 can identify the system user 108 of FIG. 1, one or more of the further participants 110 of FIG. 1, detailed information associated thereto, or a combination thereof.

For example, the profile module 502 can recognize the system user 108, one or more of the further participants 110, or a combination thereof. Also for example, the profile module 502 can further determine the user profile 202 of FIG. 2 associated with the system user 108, the one or more of the further participants 110, or a combination thereof. Also for example, the profile module 502 can determine similarities or patterns across multiple users. The profile module 502 can include a recognition module 518, a user grouping module 520, or a combination thereof for identifying one or more end users.

The recognition module 518 is configured to recognize the one or more end users. The recognition module 518 can recognize the system user 108, one or more of the further participants 110, or a combination thereof. The recognition module 518 can recognize the system user 108, the one or more of the further participants 110, or a combination thereof based on matching incoming input information to identification information corresponding to the system user 108, the one or more of the further participants 110, or a combination thereof.

For example, the recognition module 518 can include predetermined or known information regarding physical features, such as vocal signatures, facial features, finger prints, or a combination thereof, corresponding to and unique to each end user. The recognition module 518 can include predetermined or known information regarding physical features imported from other accounts, set up during account or system initiation, provided by authentic or trustworthy sources, or a combination thereof.

Continuing with the example, the recognition module 518 can recognize the system user 108, the one or more of the further participants 110, or a combination thereof based on matching signals or information incoming to the navigation system 100, such as visual or audio information through the first user interface 418 of FIG. 4, the second user interface 438 of FIG. 4, the first communication circuit 416 of FIG. 4, the second communication circuit 436 of FIG. 4, or a combination thereof to the known or predetermined physical information. The recognition module 518 can compare the predetermined or known physical information with the input information using the first control circuit 412 of FIG. 4, the second control circuit 434 of FIG. 4, or a combination thereof.

Also for example, the recognition module 518 can include predetermined or known identifier, such as an account name or an email address, along with a corresponding authentication mechanism, such as a password or a key. The recognition module 518 can receive the identifier and the authentication mechanism using one or more user interfaces, communication circuits, device interfaces, or a combination thereof. The recognition module 518 can recognize the system user 108, the one or more of the further participants 110, or a combination thereof based on matching the identifier and the authentication mechanism corresponding to the system user 108, the one or more of the further participants 110, or a combination thereof.

The recognition module 518 can further identify the end user based on determining the corresponding description. The recognition module 518 can determine the user profile 202 associated with the system user 108, the one or more of the further participants 110, or a combination thereof. The recognition module 518 can determine the user profile 202 based on generating the user profile 202, recalling or accessing the user profile 202, or a combination thereof.

The recognition module 518 can generate the user profile 202 based on information generated by the corresponding end user, such as during initiation or creation of an account or granting of access to a system, a device, a service, or a combination thereof. For example, the recognition module 518 can prompt or query the system user 108, the one or more of the further participants 110, or a combination thereof as part of account creation or profile set up process for descriptive information, such as name, address, significant locations, preferences, demographics, professional information, associated vehicles, physical identifiers, account identifier, authentication mechanism, or a combination thereof.

Also for example, the recognition module 518 can receive a survey, a setup or an initiation file including the necessary descriptive information regarding the system user 108, the one or more of the further participants 110, or a combination thereof. Also for example, the recognition module 518 can access and receive descriptive information from an existing profile or description, such as from a social network or a webpage including professional or personal description.

The recognition module 518 can format and organize the descriptive information to generate the user profile 202 for corresponding instance of the system user 108, the one or more of the further participants 110, or a combination thereof. The recognition module 518 can store the user profile 202 in the first storage circuit 414 of FIG. 4, the second storage circuit 446 of FIG. 4, or a combination thereof.

The recognition module 518 can recall or access the user profile 202 based on authentication of the end user accessing the navigation system 100. The recognition module 518 can use first control interface 422 of FIG. 4, the second control interface 444 of FIG. 4, the first storage interface 424 of FIG. 4, the second storage interface 448 of FIG. 4, the first communication interface 428 of FIG. 4, the second communication interface 450 of FIG. 4, or a combination thereof to access the stored instance of the user profile 202.

The recognition module 518 can use the first control circuit 412, the second control circuit 434, or a combination thereof to compare the accessed profile information with a particular end user. The recognition module 518 can identify corresponding the user profile 202, such as with matching identifier, authentication, physical identifier, or a combination thereof, to access and recall the user profile 202 corresponding to the end user.

The user grouping module 520 is configured to determine similarities or patterns across multiple users. The user grouping module 520 can generate the user grouping 208 of FIG. 2 including the correlated grouping 210 of FIG. 2. The user grouping module 520 can determine the correlated grouping 210 for representing one or more of the further participants 110 similar to the system user 108 in one or more aspects.

The user grouping module 520 can determine the correlated grouping 210 based on comparing instances of the user grouping 208. The user grouping module 520 can determine the correlated grouping 210 based on one or more type or category of descriptive information. For example, the user grouping module 520 can determine correlated grouping 210 for the system user 108 for representing one or more of the further participants 110 with matching demographics information, geographical zones or areas for significant locations, or a combination thereof.

As a more specific example, the user grouping module 520 can determine correlated grouping 210 based on end users sharing 'home' on a same block, identifying same address or entity name for 'work' or 'school', overlapping a surrounding zone or a buffer area around such significant locations, or a combination thereof. Also as a more specific example, the user grouping module 520 can determine correlated grouping 210 based on end users sharing an estimated route between significant locations, overlapping the surrounding zone or the buffer area around such estimated route.

The user grouping module 520 can access the instances of the user profile 202 from one or more of the storage circuits using one or more of the interfaces, one or more of communication circuits, or a combination thereof as described above. The user grouping module 520 can generate the user grouping 208 including comparing the instances of the user profile 202 and determining similarities or patterns across multiple users using the first control circuit 412, the second control circuit 434, or a combination thereof. The user grouping module 520 can store the user grouping 208 in the first storage circuit 414, the second storage circuit 446, or a combination thereof.

After identifying the one or more end users, the control flow can pass from the profile module 502 to the tracking module 504. For example, the control flow can pass by having a processing result, such as the user profile 202 or the user grouping as an output from the profile module 502 to an input of the tracking module 504.

Also for example, the control flow can further pass by storing the processing result at a location known and accessible to the tracking module 504. Also for example, the control flow can further pass by notifying the tracking module 504, such as by using a flag, an interrupt, a status signal, or a combination thereof. Also for example, the control flow can further pass using a combination of the processes described above.

The tracking module 504 is configured to determine movement or travel of the end user. The tracking module 504 can determine the movement or travel information based on the candidate route set 212 of FIG. 2, the selected route 236 of FIG. 2, the previous trace 326 of FIG. 3, the contextual parameters 244 of FIG. 2 associated thereto, or a combination thereof.

The tracking module 504 can determine, update, and maintain the user history 246 of FIG. 2. The tracking module 504 can record location information, such as coordinates or location markers in the user history 246. The tracking module 504 can further record the route selections of the end user in the user history 246. The tracking module 504 can further process and analyze the user history 246 for patterns, meanings, significance, or a combination thereof. The tracking module 504 can include a selection module 522, a free-drive module 524, a context module 526, or a combination thereof for determining the movement or the travel information of the system user 108, one or more of the further participants 110, or a combination thereof.

The selection module 522 is configured to identify route selection of the end user. The selection module 522 can identify the candidate route set 212, the selected route 236, or a combination thereof. The selection module 522 can identify route selection based on tracking search or navigation request from the end user and corresponding results.

The selection module 522 can identify the route selection based on storing the candidate route set 212, the one or more instances of the candidate route 214 therein, a candidate POI, or a combination thereof calculated by the navigation system 100 in response to the search request or the navigation request from the end user. The selection module 522 can further identify the selected route 236 chosen by the end user, such as the system user 108 or one or more of the further participants 110, from the candidate route set 212, search result set, or a combination thereof.

The selection module 522 can further identify the non-default selection 242 of FIG. 2 for the selected route 236. The selection module 522 can analyze the selected route 236 in comparison to the candidate route set 212 to identify the non-default selection 242.

For example, the selection module 522 can identify the non-default selection 242 when the selected route 236 is not the default selection, not the candidate route 214 generated using the user preference profile 248 of FIG. 2, or a combination thereof. As a more specific example, the selection module 522 can identify the selected route 236 as the non-default selection 242 when the selected route 236 is not the shortest route 238 of FIG. 2, not the fastest route 240 of FIG. 2, not the preference-based route 234 of FIG. 2, or a combination thereof.

The selection module 522 can identify the non-default selection 242 based on classifications during generation of the candidate route set 212 or calculation of the candidate route 214. The selection module 522 can classify one or more instance of the candidate route 214 as the shortest route 238, the fastest route 240, the preference-based route 234, or a combination thereof during calculation of the candidate route 214 or generation of the candidate route set 212. Details regarding the classification are discussed below.

The selection module 522 can further identify the non-default selection 242 based on comparing the selected route 236 to other instances of the candidate route 214 within the candidate route set 212. The selection module 522 can calculate the arrival time estimate 216 of FIG. 2, the candidate distance 218 of FIG. 2, or a combination thereof corresponding to each instance of the candidate route 214 within the candidate route set 212.

The selection module 522 can compare and analyze the various calculation results across the routes within the candidate route set 212. The selection module 522 can identify the non-default selection 242 when the selected route 236 does not correspond to the default selection or the efficient route according to the comparison of the arrival time estimate 216, the candidate distance 218, or a combination thereof across the routes within the candidate route set 212.

The selection module 522 can identify route selection of the end user using the first control circuit 412, the second control circuit 434, or a combination thereof. The selection module 522 can access the routes or information associated thereto stored in the first storage circuit 414, the second storage circuit 446, or a combination thereof using one or more interfaces, one or more communication circuits, or a combination thereof. The selection module 522 can store route selection, such as the identification of the selected route 236, the non-default selection 242, or a combination thereof, in the first storage circuit 414, the second storage circuit 446, or a combination thereof.

The free-drive module 524 is configured to analyze movement or travel of the end user unassociated with the route selection. The free-drive module 524 can analyze the free-drive session of the system user 108, one or more of the further participants 110, or a combination thereof. The free-drive module 524 can analyze previous or current instance of the free-drive session.

The free-drive module 524 can identify a geographic location of the end user or a device corresponding to the end user. For example, the free-drive module 524 can identify the geographic location using the location circuit 420 of FIG. 4, the first communication circuit 416, the second communication circuit 436, or a combination thereof. The free-drive module 524 can store the location information outside of the selected route 236, without search request or navigation request, or a combination thereof for the free-drive session. The free-drive module 524 can further store the time marker 328 of FIG. 3 corresponding to the location information.

The free-drive module 524 can use the first control circuit 412, the second control circuit 434, or a combination thereof to analyze the geographic locations. The free-drive module 524 can analyze the geographic locations by sorting or sequencing the locations according to the corresponding instance of the time marker 328. The free-drive module 524 can further determine the destination estimate 332 of FIG. 3 corresponding to the free-drive session.

The free-drive module 524 can determine the destination estimate 332 in a variety of ways. For example, the free-drive module 524 can determine the destination estimate 332 based on the contextual parameters 244. As a more specific example, the free-drive module 524 can determine the destination estimate 332 based on the user message set 310 of FIG. 3, the passenger set 308 of FIG. 3, routing or navigation request of another passenger, calendar information, or a combination thereof. Also for example, the free-drive module 524 can determine the destination estimate 332 based on the user history 246 of FIG. 3.

Also for example, the free-drive module 524 can determine the destination estimate 332 based on analyzing time spent at a location or a duration of time between locations. The free-drive module 524 can determine using the time filter 334 of FIG. 3, the destination time threshold 338 of FIG. 3, the intermediate time threshold 340 of FIG. 3, or a combination thereof. The free-drive module 524 can use the time filter 334 to determine the candidate stop 336 of FIG. 3 from the location information and the time marker 328 or a duration of time at the location information.

Continuing with the example, the free-drive module 524 can further compare the intermediate time threshold 340, the destination time threshold 338, or a combination thereof to the time marker 328 or the duration of time associated with the candidate stop 336. The free-drive module 524 can determine the candidate stop 336 as the destination estimate 332 or the intermediate stop 342 of FIG. 3 based on the comparison.

The free-drive module 524 can further dynamically adjust the time filter 334, the destination time threshold 338, the intermediate time threshold 340, or a combination thereof. The free-drive module 524 can dynamically adjust based on or according to the contextual parameters 244. The free-drive module 524 can increase or decrease the filter, threshold, or a combination thereof based on the situation of the user.

For example, the free-drive module 524 can increase the filter, the threshold, or a combination thereof when the current time is within a traffic congestion time period. Also for example, the free-drive module 524 can increase the filter, the threshold, or a combination thereof when the current location is within a predetermined zone associated with high density of pedestrians, such as a school zone, a downtown area, a shopping zone, between an establishment and a corresponding parking area, or a combination thereof.

The free-drive module 524 can use the destination estimate 332 and the geographic information to identify the previous trace 326 to the destination estimate 332. The free-drive module 524 can identify the previous trace 326 as the series of connected locations traversed by the corresponding end user, such as the system user 108, one or more of the further participants 110, or a combination thereof, between instances of the destination estimate 332, navigation requests, or a combination thereof.

The free-drive module 524 can store the geographic locations in the first storage circuit 414, the second storage circuit 446, or a combination thereof. The free-drive module 524 can further store the destination estimate 332, the intermediate stop 342, the candidate stop 336, the previous trace 326, or a combination thereof in the first storage circuit 414, the second storage circuit 446, or a combination thereof. The free-drive module 524 can further access the filter, the thresholds, the geographic information, the contextual parameters 244, or a combination thereof using one or more of the interfaces, one or more of communication circuits, or a combination thereof.

The context module 526 is configured to determine the contextual parameters 244. The context module 526 can determine the contextual parameters 244 dynamically in real-time. The context module 526 can determine the contextual parameters 244 including the user context 302 of FIG. 3, the route context 312 of FIG. 3, or a combination thereof.

The context module 526 can store the contextual parameters 244 for further processing at a later time. The context module 526 can determine the contextual parameters 244 corresponding to the selected route 236 including the non-default selection 242, the candidate route set 212, a request or a search associated thereto, the previous trace 326, or a combination thereof.

The context module 526 can identify the contextual parameters 244 based on accessing specific circuits, memory locations, devices, or a combination thereof. For example, the context module 526 can identify the subsequent event 304 of FIG. 3, the preceding event 306 of FIG. 3, the user message set 310, or a combination thereof from memory locations associated with corresponding applications, such as calendar or scheduling applications or communications applications.

Also for example, the context module 526 can access the location circuit 420 for the location information. Also for example, the context module 526 can access one or more of the user interfaces, one or more of communication circuits, or a combination thereof to determine the passenger set 308 of FIG. 3.

Also for example, the context module 526 can further store the current location, the current time, or a combination thereof as the request sourcing location 316 of FIG. 3, the request time 318 of FIG. 3 or the travel initiation time 320 of FIG. 3, or a combination thereof according to movement information or input from the system user 108. Also for example, the context module 526 can determine the destination category 314 of FIG. 3 for the destination estimate 332 or the stated destination corresponding to the selected route 236 provided by the system user 108.

Also for example, the context module 526 can store the search term 322 of FIG. 3 associated with the candidate route set 212 or the selected route 236. The context module 526 can use one or more of the interfaces, one or more of the communication circuits, or a combination thereof to access the information. The context module 526 can use one or more of the control circuits to identify the contextual parameters 244. The context module 526 can further store the contextual parameters 244 along with the corresponding route, selection, or location in one or more of the storage circuits.

The tracking module 504 can implement the context module 526 using an iterative process or mechanism with the selection module 522 or the free-drive module 524. The tracking module 504 can further implement the context module 526 in parallel to the selection module 522, the free-drive module 524, or a combination thereof.

After determining movement or travel of the end user, the control flow can pass from the tracking module 504 to the decomposition module 506, the profile module 502, or a combination thereof. The control flow can pass similarly as described above between the profile module 502 and the tracking module 504, but using processing results of the tracking module 504, such as the contextual parameters 244, the user history 246 or the selected route 236, the non-default selection 242, the previous trace 326, the destination estimate 332, or a combination thereof within the user history 246, or a combination thereof.

The profile module 502 can further use the user history 246, the contextual parameters 244, a portion therein, or a combination thereof to group the end users. The profile module 502 can group the end users according to similarities or predetermined connection in the user history 246, the contextual parameters 244, a portion therein, or a combination thereof.

The decomposition module 506 is configured to determine the route decomposition profile 220 of FIG. 2 corresponding to one or more of the routes associated with the end user. The decomposition module 506 can determine the route decomposition profile 220 for the candidate route 214 within the candidate route set 212, the selected route 236, the previous trace 326, or a combination thereof. The decomposition module 506 can determine the route decomposition profile 220 based on analyzing the one or more routes.

The decomposition module 506 can analyze maneuvers, segments, conditions or consequences associated thereto, or a combination thereof for the one or more routes. For example, the decomposition module 506 can determine the maneuver set 222 of FIG. 2, the segment category set 224 of FIG. 2, the segment surface condition 226 of FIG. 2, the maneuver delay time 228 of FIG. 2, the traffic density 230 of FIG. 2, the maneuver difficulty rating 232 of FIG. 2, or a combination thereof corresponding to the selected route 236, the instances of the candidate route 214 in the candidate route set 212, the previous trace 326, or a combination thereof.

The decomposition module 506 can determine the segment category set 224 based on identifying individual segments, edges, paths, roads, or a combination thereof included in the corresponding route. The decomposition module 506 can use map information to identify the individual segments, edges, paths, roads, or a combination thereof. The decomposition module 506 can further determine the segment category set 224 based on a name, a categorization, a shape or a marker, a location, a size, or a combination thereof associated with the individual segments edges, paths, roads, or a combination thereof according to the map information.

The decomposition module 506 can determine the maneuver set 222 based on a variety of ways. For example, the decomposition module 506 can determine the maneuver set 222 based on navigation guidance information designated to instruct or notify the system user 108 to follow the corresponding route. The decomposition module 506 can search the guidance information for predetermined keywords, such as 'right', 'left', 'lane', 'turn', 'merge', 'exit', or a combination thereof. The decomposition module 506 can determine the maneuver set 222 based on matching the keywords within the guidance information.

Also for example, the decomposition module 506 can determine the maneuver set 222 based on the identified segments, edges, paths, roads, or a combination thereof and corresponding nodes. The decomposition module 506 can search or identify a connection or a transition between instances of the segments, edges, paths, roads, or a combination thereof along the corresponding route.

Continuing with the example, the decomposition module 506 can further determine a 'from' and 'to' relationship between the connecting segments, a travel direction for the system user 108, or a combination thereof. The decomposition module 506 can compare the 'from' and 'to' information, the travel direction, the relative orientations of the segments according to the map information, or a combination thereof to predetermined set of template information for identifying various possible maneuvers. The decomposition module 506 can determine the maneuver set 222 based on matching the various information to the predetermined set.

The decomposition module 506 can determine the segment surface condition 226 in various ways. For example, the decomposition module 506 can determine the segment surface condition 226 based on information from entities maintaining or managing the segment surface condition 226, such as websites or databases provided by government entities or construction companies.

Also for example, the decomposition module 506 can determine the segment surface condition 226 based on information from the end users. The decomposition module 506 can use crowd-sourcing mechanism to receive direct feedbacks or descriptions for the segment surface condition 226 from the system user 108, the one or more of the further participants 110, or a combination thereof. The decomposition module 506 can use the crowd-source information to determine the segment surface condition 226.

Also for example, the decomposition module 506 can use the readings from the accelerometer, such as from the location circuit, microphones, such as from the user interface, or a combination thereof to estimate the segment surface condition 226. Also for example, the decomposition module 506 can estimate the segment surface condition 226 based on a duration of time since construction on or of the segment, amount of traffic thereon, or a combination thereof. The decomposition module 506 can include a method, a process, an equation, a dedicated circuit, or a combination thereof for determining the segment surface condition 226 from various inputs, such as accelerometer or microphone readings, previous construction record, historical traffic information, or a combination thereof.

The decomposition module 506 can determine the maneuver delay time 228, the traffic density 230, or a combination thereof based on similar methods. For example, the decomposition module 506 can use previous historical records or trends provided by government entities or other service providers. Also for example, the decomposition module 506 can further utilize crowd-sourced information, including previously generated or real-time information.

The decomposition module 506 can determine the maneuver difficulty rating 232 based on user feedback or user rating. For example, the decomposition module 506 can utilize a difficult rating, keywords, such as "difficult" or "hard", in comments or reviews provided by the system user 108, one or more of the further participants 110, or a combination thereof to determine the maneuver difficulty rating 232.

The decomposition module 506 can further determine the maneuver difficulty rating 232 based on map information, movement information, accident records, or a combination thereof. For example, the decomposition module 506 can determine the maneuver difficulty rating 232 based on an angle or shape of roads or edges, angle between segments, the segment category, the historical flow rate, reduction of speed across travelers, number of accidents, or a combination thereof. The decomposition module 506 can include an equation, a process, a method, a mechanism, a dedicated circuit, or a combination thereof for analyzing and combining the various factors to determine the maneuver difficulty rating 232.

The decomposition module 506 can use the first control circuit 412, the second control circuit 434, or a combination thereof to determine the route decomposition profile 220 corresponding to the one or more routes. The decomposition module 506 can store the route decomposition profile 220, a portion therein, other intermediate results, or a combination thereof in the first storage circuit 414, the second storage circuit 446, or a combination thereof.

The analysis module 508 is configured to initialize preference estimation process for determining the preferences of the corresponding end user. The analysis module 508 can initialize the user preference profile 248 corresponding to the system user 108, one or more of the further participants 110, or a combination thereof.

The analysis module 508 can initialize the user preference profile 248 based on generating the initial profile 344 of FIG. 3, based on sorting or organizing data, or a combination thereof. The analysis module 508 can include an initialization module 528, a data grouping module 530, or a combination thereof.

The initialization module 528 is configured to generate the initial profile 344 corresponding to the system user 108, one or more of the further participants 110, or a combination thereof. For example, the initialization module 528 can generate the initial profile 344 representing the system user 108 based on the user grouping 208 including the correlated grouping 210 for representing the further participants 110 corresponding to or similar to the system user 108.

The initialization module 528 can generate the initial profile 344 representing the system user 108 based on the user preference profile 248 of one or more of the further participants 110 similar to the system user 108. The initialization module 528 can identify the similarities according to the correlated grouping 210 including the system user 108.

For example, the initialization module 528 can generate the initial profile 344 as the user preference profile 248 of the one or more of the further participants 110 belonging to the correlated grouping 210 according to matching instance of the user description 206 of FIG. 2. Also for example, the initialization module 528 can generate the initial profile 344 as an average value or most-often occurring value within the correlated grouping 210.

The initialization module 528 can generate the initial profile 344 based on the correlated grouping 210 corresponding to variety of information. For example, the initialization module 528 can generate the initial profile 344 based on the correlated grouping 210 corresponding to living or working within a same area, traveling through same neighborhoods, same or overlapping demographic information, or a combination thereof.

Also for example, the initialization module 528 can generate the initial profile 344 based on the correlated grouping 210 corresponding to similarities in the contextual parameters 244, similarities in the user history 246 or the selected route 236 therein, or a combination thereof. Also for example, the initialization module 528 can generate the initial profile 344 based on the correlated grouping 210 corresponding to social connections, such as families, friends, coworkers, or a combination thereof.

The initialization module 528 can further generate the initial profile 344 based on input from the system user 108. For example, the initialization module 528 can generate the initial profile 344 based on queries, interactions, survey, or a combination thereof with the system user 108. The initialization module 528 can generate the initial profile 344 as the preferences or information provided by corresponding end user.

The initialization module 528 can use the first control circuit 412, the second control circuit 434, or a combination thereof to generate the initial profile 344. The initialization module 528 can store the initial profile 344, a portion therein, other intermediate results, or a combination thereof in the first storage circuit 414, the second storage circuit 446, or a combination thereof.

The data grouping module 530 is configured to organize data for further generating and updating the user preference profile 248. The data grouping module 530 can group or organize the route information corresponding to the end user. The data grouping module 530 can group or organize instances of the selected route 236, instances of the previous trace 326, or a combination thereof. For example, the data grouping module 530 can generate a preference analysis set 532, a control set 534, or a combination thereof.

The preference analysis set 532 is a grouping of routes or data associated thereto selected or traversed by an end user, with the routes corresponding to the non-default selection 242. The preference analysis set 532 can include instances of the selected route 236 determined to be the non-default selection 242, the contextual parameters 244 associated thereto, the candidate route set 212, or a combination thereof. The control set 534 is a grouping of routes or data associated thereto selected or traversed by an end user, with the routes corresponding to the default selection, such as the fastest route 240, the shortest route 238, the preference-based route 234, or a combination thereof.

The data grouping module 530 can generate the preference analysis set 532, the control set 534, or a combination thereof for grouping the data based on changing data storage location, placing a common label or a tag, generating a map or a list of data storage location, or a combination thereof. For example, the data grouping module 530 can generate preference analysis set 532 based on the non-default selection 242. The data grouping module 530 can generate the preference analysis set 532 based on changing data storage location, placing a common label or a tag, generating a map or a list of data storage location, or a combination thereof for grouping together instances of the non-default selection 242, the contextual parameters 244 associated thereto, the candidate route set 212, or a combination thereof.

Also for example, the data grouping module 530 can similarly generate the control set 534 based on changing data storage location, placing a common label or a tag, generating a map or a list of data storage location, or a combination thereof for grouping together instances of the default selection, the contextual parameters 244 associated thereto, the candidate route set 212, or a combination thereof. The data grouping module 530 can generate the control set 534 based on the selected route 236 including the shortest route 238, the fastest route 240, or a combination thereof from the user history 246. Also for example, the data grouping module 530 can generate the preference analysis set 532 or the control set 534 as the remaining instances of the routes or associated contextual parameters after generating the control set 534 or the preference analysis set 532, respectively.

The data grouping module 530 can further group the routes or contextual parameters based on a recent time-window 536. The recent time-window 536 can include a duration or a time associated with a time or a moment of the processing. The recent time-window 536 can include a duration or a time leading up to the time or the movement of the processing. The recent time-window 536 can be for identifying and analyzing recent behavior or trend of the corresponding end user.

The data grouping module 530 can group the routes, such as the default route or the non-default or non-efficient routes, the contextual parameters 244 associated thereto, or a combination thereof according to the recent time-window 536. The analysis module 508 can group the routes or data associated thereto generated or traversed within the recent time-window 536.

The data grouping module 530 can use the first control circuit 412, the second control circuit 434, or a combination thereof to organize the data for generating and updating the user preference profile 248 including generating the preference analysis set 532, generating the control set 534, determining the recent time-window 536 or the data associated thereto, or a combination thereof. The data grouping module 530 can further store the organization or the grouping, including the preference analysis set 532, the control set 534, the recent time-window 536 or the data associated thereto, or a combination thereof in the first storage circuit 414, the second storage circuit 446, or a combination thereof.

After initializing preference estimation process, the control flow can pass from the analysis module 508 to the preference module 510. The control flow can pass similarly as described above between the profile module 502 and the tracking module 504, but using processing results of the analysis module 508, such as the preference analysis set 532, the control set 534, the recent time-window 536, the initial profile 344, or a combination thereof.

The preference module 510 is configured to generate or update preferences of the end user regarding navigation or routing. The preference module 510 can generate or update the user preference profile 248 for representing the preferences of the end user. The preference module 510 can generate or update the user preference profile 248 for representing a preference of the system user 108 for navigation information.

The preference module 510 can generate or update the user preference profile 248 based on the preference analysis set 532, the control set 534, or a combination thereof. The preference module 510 can generate or update the user preference profile 248 based on the default selection, the non-default selection 242, the contextual parameters 244 associated thereto, the initial profile 344, or a combination thereof.

The preference module 510 can generate or update the user preference profile 248 based on updating the initial profile 344. The preference module 510 can update the initial profile 344 based on changing a value or a magnitude associated with the maneuver preference 346 of FIG. 3, the segment preference 348 of FIG. 3, the rating preference 352 of FIG. 3, the optimization preference 354 of FIG. 3, the brand preference 356 of FIG. 3, the entertainment preference 358 of FIG. 3, or a combination thereof for the initial profile 344. The preference module 510 can utilize the non-default selection 242 or the contextual parameters 244 associated thereto to identify the preference of the system user 108.

The preference module 510 can generate or update the user preference profile 248 based on calculating an importance for the maneuver preference 346, the segment preference 348, the rating preference 352, the optimization preference 354, the brand preference 356, the entertainment preference 358, a specific value thereof, or a combination thereof corresponding to a value or a set of values for the contextual parameters 244. The preference module 510 can calculate the importance using statistical calculations, such as total, average or mean, or frequency. The preference module 510 can further calculate the importance based on calculating correlation between the selected route 236 or a component therein and the contextual parameters 244.

For example, the preference module 510 can calculate an ease rating, an accessibility parameter, a cost, such as the arrival time estimate 216 or the candidate distance 218, or a combination thereof for each instance of the search result, the candidate route 214, or a combination thereof. The preference module 510 can utilize the route decomposition profile 220 corresponding to each instance of the candidate route 214 or the route corresponding to each of the search results. The preference module 510 can calculate a factor update score 538 corresponding to the selected route 236 in light of the candidate route set 212.

The factor update score 538 is a value or a parameter representing an indication of a navigational or routing preference of the corresponding end user. The factor update score 538 can be based on a strength of a feature or a characteristic of the selected route 236. The factor update score 538 can further be based on a difference between the initial profile 344 or previously existing instance of the user preference profile 248 and the selected route 236.

The preference module 510 can calculate the factor update score 538 specific to or corresponding to one or more of the fields or parameters within the user preference profile 248. For example, the preference module 510 can calculate the factor update score 538 specific to or corresponding to the maneuver preference 346, the segment preference 348, the rating preference 352, the optimization preference 354, the brand preference 356, the entertainment preference 358, or a combination thereof.

The preference module 510 can calculate the factor update score 538 based on comparing the calculated ease, accessibility, cost, or a combination thereof or the route decomposition profile 220 of the selected route 236 to the remaining instances of the candidate route 214 within the candidate route set 212. The factor update score 538 can further calculate the factor update score 538 based on comparing the calculated ease, accessibility, cost, or a combination thereof or the route decomposition profile 220 of the selected route 236 to the initial profile 344 or previously existing instance of the user preference profile 248.

The preference module 510 can calculate the factor update score 538 as a positive value for representing similarity or overlap between one or more fields or parameters for the selected route 236 and the initial profile 344 or previously existing instance of the user preference profile 248. The preference module 510 can calculate the factor update score 538 as a negative value or a negative rating 540 for representing differences between one or more fields or parameters for the selected route 236 and the initial profile 344 or previously existing instance of the user preference profile 248.

The preference module 510 can calculate a magnitude or a value for the factor update score 538 based on an amount of overlap or similarity, such as for a number of overlapping or similar parameters or fields, between the selected route 236 and the initial profile 344 or previously existing instance of the user preference profile 248. The preference module 510 can further calculate the magnitude or the value of the factor update score 538 based on an amount of difference, such as a degree or amount of separation for difference in values of same parameters or fields or a number of fields or parameters with differing values, between the selected route 236 and the initial profile 344 or previously existing instance of the user preference profile 248.

The preference module 510 can further calculate the magnitude or the value of the factor update score 538 based on comparing previous instances of the selected route 236, associated instances of the candidate route set 212, the contextual parameters associated thereto, or a combination thereof. The preference module 510 can further calculate the magnitude or the value of the factor update score 538 based on a measure of uniqueness of the selected route 236 in comparison to the candidate route set 212, a historical record or trend thereof, or a combination thereof.

For example, the preference module 510 can use a method, a process, a mechanism, an equation, or a combination thereof, including pattern recognition or machine learning mechanism, predetermined by the navigation system 100 to determine a repeatedly occurring factor in the selected route 236 different from the associated instance of the candidate route set 212. The preference module 510 can similarly determine a repeatedly occurring instances of the contextual parameters 244 associated with the repeatedly occurring factors.

As a more specific example, the preference module 510 can determine the patterns using instances of the non-default selection 242 within the preference analysis set 532. The preference module 510 can compare the patterns to the default selections within the control set 534. The preference module 510 can compare the non-default selection 242 with instances of the selected route 236 corresponding to default routes including the shortest route 238, the fastest route 240, the preference-based route 234, or a combination thereof.

The preference module 510 can generate or update the user preference profile 248 including the maneuver preference 346, the segment preference 348, the rating preference 352, the optimization preference 354, the brand preference 356, the entertainment preference 358, or a combination thereof. The preference module 510 can generate or update the user preference profile 248 including the maneuver preference 346, the segment preference 348, the rating preference 352, the optimization preference 354, the brand preference 356, the entertainment preference 358, or a combination thereof as described above.

For example, the preference module 510 can determine the maneuver preference 346 based on comparing the maneuver set 222 of FIG. 2. The preference module 510 can calculate statistics for maneuvers for instances of the selected route 236 in comparison to associated instances of the candidate route set 212 along with the associated instances of the contextual parameters 244.

Continuing with the example, the preference module 510 can further determine clusters, grouping, patterns, or a combination thereof for maneuvers or a sequence thereof for instances of the selected route 236 in comparison to associated instances of the candidate route set 212 along with the associated instances of the contextual parameters 244. The preference module 510 can determine the maneuver preference 346 based on frequently occurring instance or series of maneuvers, cluster or outlying instance of maneuvers, frequently occurring contextual parameters 244 or clusters thereof, or a combination thereof.

Also for example, the preference module 510 can determine the segment preference 348 based on comparing the segment set, the segment category set 224, the segment surface condition 226, the maneuver delay time 228, the traffic density 230, or a combination thereof. The preference module 510 can similarly determine commonly traveled or chosen segment, the avoidance area 350 of FIG. 3, a category thereof, a sequence thereof, the contextual parameters 244 associated thereto, or a combination thereof.

Also for example, the preference module 510 can determine the rating preference 352 based on similarly comparing the maneuver difficulty rating 232. The preference module 510 can similarly determine a minimum, a maximum, or a range of level preferred or avoided by the system user 108.

Also for example, the preference module 510 can determine the optimization preference 354 can determine the optimization preference 354 based on comparing the contextual parameters 244 for the preference analysis set 532 and the control set 534. The preference module 510 can identify a scenario or a set of conditions represented by the contextual parameters 244 corresponding to the preference the system user 108. The preference module 510 can identify the scenario or the set of conditions for the efficient route, such as the shortest route 238 or the fastest route 240, for adjusting or favoring an influence of one or more specific factor, or a combination thereof.

Also for example, the preference module 510 can determine the brand preference 356 based on similarly comparing the selected route 236 or the POI corresponding thereto, the selected search result, the destination estimate 332, or a combination thereof. Also for example, the preference module 510 can determine the entertainment preference 358 based on identifying historical or scenic designation for a segment, a surrounding map entity adjacent to the segment or the categorization thereof, or a combination thereof. The preference module 510 can similarly determine the entertainment preference 358 as the segment, the categorization, the adjacent entity, circumstances associated thereto, or a combination thereof.

The preference module 510 can further utilize the previous trace 326 in addition to the selected route 236. The preference module 510 can further calculate or generate the candidate route set 212 for the destination estimate 332 associated with the previous trace 326.

The preference module 510 can process the previous trace 326 in place of the selected route 236. For example, the preference module 510 can designate the previous trace 326 as the default selection, the shortest route 238, the fastest route 240, the non-default selection 242, such as the non-efficient selection, or a combination thereof. The preference module 510 can further analyze the previous trace 326, the contextual parameters associated thereto, or a combination thereof in comparison to the calculated or generated instances of the candidate route set 212 associated thereto.

The preference module 510 can calculate the factor update score 538, the negative rating 540, or a combination thereof corresponding to each of the maneuver preference 346, the segment preference 348, the avoidance area 350, the rating preference 352, the optimization preference 354, the brand preference 356, or a combination thereof as described above. The preference module 510 can group or organize instances of the factor update score 538, the negative rating 540, or a combination thereof according to common conditions or settings as represented by the corresponding instances of the contextual parameters 244.

The preference module 510 can generate or update the factor adjustment set 360 of FIG. 3 as the instances of the factor update score 538, the negative rating 540, or a combination thereof for the specific situation or the scenario. The preference module 510 can generate or update the corresponding instance of the parameter condition 362 of FIG. 3 as the contextual parameters 244 corresponding to specific combination of the factor update score 538, the negative rating 540, or a combination thereof for the specific situation or the scenario.

The preference module 510 can further calculate the road-learning rate 364 of FIG. 3 based on the user history 246. The preference module 510 can calculate the road-learning rate 364 based on identifying instances of the selected route 236 and the previous trace 326 to the same location. The preference module 510 can calculate the road-learning rate 364 based on a number of occurrences, a time between the occurrences, other contextual parameters, or a combination thereof for the selected route 236 before occurrence of the previous trace 326 corresponding to the destination estimate 332 overlapping or same as the destination of the selected route 236.

The preference module 510 can further calculate the arrival-time adjustment 366 of FIG. 3 for personalizing and updating the arrival time estimate 216 for the system user 108. The preference module 510 can calculate the arrival-time adjustment 366 based on comparing the arrival time estimate 216 of the selected route 236, the previous trace 326, or a combination thereof to the actual time arrival of the system user 108 at the corresponding destination. The preference module 510 can calculate the arrival-time adjustment 366 based on the difference between the actual arrival time and the arrival time estimate 216.

The preference module 510 can further determine correlation of the difference with the maneuver set 222, the segment category set 224, the segment set, the segment surface condition 226, the traffic density 230, the maneuver difficulty rating 232, or combination thereof to determine patterns or influencing factors for the arrival-time adjustment 366. The preference module 510 can calculate the arrival-time adjustment 366 similar to the factor adjustment set 360 along with corresponding instances of the contextual parameters 244 representing the maneuver set 222, the segment category set 224, the segment set, the segment surface condition 226, the traffic density 230, the maneuver difficulty rating 232, or combination thereof.

The preference module 510 can further generate or update the user preference profile 248 or a portion therein based on a recent deviation trend 542. The recent deviation trend 542 is a pattern in travels or movements of the user or a change in an influencing factor. The recent deviation trend 542 can be based on the recent time-window 536.

The preference module 510 can calculate the recent deviation trend 542 corresponding to the recent time-window 536 from the non-default selection 242. The preference module 510 can calculate the recent deviation trend 542 based on the non-default selection 242 in the preference analysis set 532 selected within the recent time-window 536.

The preference module 510 can further calculate the recent deviation trend 542 based on the previous trace 326 occurring within the recent time-window 536. The preference module 510 can calculate the recent deviation trend 542 similar to the factor update score 538, the factor adjustment set 360, the parameter condition 362, or a combination thereof as described above but with a set of data limited according to the recent time-window 536.

The preference module 510 can compare the result of the data within the recent time-window 536 to the overall data, to the previously existing instance of the user preference profile 248, or a combination thereof. The preference module 510 can generate or update the user preference profile 248 based on the recent deviation trend 542. For example, the preference module 510 can generate or update the user preference profile 248 based on including the recent deviation trend 542, replacing a corresponding component or factor within the user preference profile 248 with the recent deviation trend 542, influencing or calculating the preference-based route 234, or a combination thereof.

The preference module 510 can use the first control circuit 412, the second control circuit 434, or a combination thereof to generate or update preferences of the end user regarding navigation or routing. The preference module 510 can store the results, such as the user preference profile 248, the factor update score 538, the recent deviation trend 542, or a combination thereof in the first storage circuit 414, the second storage circuit 446, or a combination thereof.

After generating or updating the preferences of the end user, the control flow can pass to the route module 514, the map evaluation module 516, or a combination thereof. The control flow can pass similarly as described above between the profile module 502 and the tracking module 504, but using processing results of the preference module 510, such as the user preference profile 248, the factor update score 538, the recent deviation trend 542, or a combination thereof.

The route module 514 is configured to calculate routes or generate navigation information. The route module 514 can calculate one or more instances of the candidate route 214. The route module 514 can calculate the candidate route 214, including the selected route 236, the efficient route, the non-efficient route, the preference-based route 234, or a combination thereof.

The route module 514 can calculate the routes using a variety of ways. For example, the route module 514 can calculate the routes based on Dijkstra's mechanism, A* mechanism, or D* mechanism.

The route module 514 can further generate the preference-based route 234. The route module 514 can generate the preference-based route 234 based on the user preference profile 248 for personalizing the preference-based route 234 for the system user 108.

The route module 514 can generate the preference-based route 234 based on current condition or situation of the system user 108. The route module 514 can access or identify current instances of the contextual parameters 244 for the system user 108. The route module 514 can access or identify or determine the current instances of the contextual parameters 244 as described above for the context module 526.

The route module 514 can compare the current set of the contextual parameters 244 to instances of the parameter condition 362. The route module 514 can identify the factor adjustment set 360 with the parameter condition 362 matching the current instances of the contextual parameters 244.

The route module 514 can use the factor adjustment set 360 matching the current situation or condition as weights, limitations or boundaries, rules, or a combination thereof for calculating the instance of the candidate route 214 corresponding to the preference-based route 234. The route module 514 can further use the factor adjustment set 360 to identify the instance of the candidate route 214 within the candidate route set 212 closest to or matching the factor adjustment set 360 as the preference-based route 234.

The route module 514 can similarly label other instances of the candidate route 214. The route module 514 can calculate the arrival time estimate 216, the candidate distance 218, or a combination thereof for each instance of the candidate route 214. The route module 514 can label or identify the efficient route or selection, such as the shortest route 238 or the fastest route 240 within the candidate route set 212.

The route module 514 can be predetermined to identify the shortest route 238, the fastest route 240, the preference-based route 234, or a combination thereof as the default selection. The route module 514 can similarly label remaining candidate routes outside of the efficient route and the preference-based route 234 as the non-default selection 242.

The route module 514 can use the first control circuit 412, the second control circuit 434, or a combination thereof to calculate the routes. The route module 514 can store the routes, the labels or designation, or other results discussed above in the first storage circuit 414, the second storage circuit 446, or a combination thereof.

The route module 514 can use one or more of the user interfaces, one or more of the communication circuits, or a combination thereof to communicate the routes or search results to the system user 108. The control flow can pass to the tracking module 504 to identify or determine the selected route 236 corresponding to the communicated routes or search results. The tracking module 504 can use the selected route 236 to further generate or update the user preference profile 248 as described above. The control flow can pass similarly as described above between the profile module 502 and the tracking module 504, but using processing results of the preference module 510, such as the routes.

It has been discovered that the user preference profile 248 based on the non-default selection 242 provides increased accuracy in recognizing preference of the system user 108. The navigation system 100 can identify the user's selections having larger influence from the personal preference of the end users by identifying the non-default selection 242. The navigation system 100 can utilize the stronger influences from the personal preference from the non-default selection 242 to accurately analyze and capture the personal preferences in generating the user preference profile 248.

It has further been discovered that the user preference profile 248 based on the contextual parameters 244 of the non-default selection 242 provides increased usability. The navigation system 100 can accurately analyze the user's preferences from the contextual parameters 244 without direct communication or update from the end user regarding their preferences. Moreover, the navigation system 100 can utilize the contextual parameters 244 to identify the conditional or situational influence, exceptions, or a combination thereof for numerous situations as preferred by the end user. The elimination of tedious input, while accurately capturing varying situational importance of numerous factors, provides the increased usability.

It has further been discovered that the user preference profile 248 based on the previous trace 326 determined as the non-default selection 242 provides further increased accuracy in representing the user's preference. The navigation system 100 can analyze the every-day driving and surrounding context using the previous trace 326, where the end user knows the area and does not require navigational assistance. Utilizing the previous trace 326 increases the number of data points and avails further set of data rich in preference-influenced driving and contextual data in generating the user preference profile 248, leading to increase in accuracy for determining the user's preference.

It has further been discovered that the user preference profile 248 generated using the initial profile 344 based on the user grouping 208 based on various similarities provides faster convergence in finding the user's preference. The navigation system 100 can utilize patterns and similarities across a larger dataset of users to make assumptions about the particular user. The assumptions can provide an initial starting point likely relevant for the particular user in comparison to utilizing an empty set of data or a constant set of data as a starting point.

It has further been discovered that the user preference profile 248 based on the recent deviation trend 542 within the recent time-window 536 provides faster accommodation for changes in the end user or their environment. The navigation system 100 can identify more relevant set of data using the recent time-window 536. The navigation system 100 can further identify recent changes remaining consistent for the end user using the recent deviation trend 542. The navigation system 100 can use the recent deviation trend 542 to identify up-to-date preferences of the end user without being negatively influenced by a large data set.

The map evaluation module 516 is configured to determine a map correction 544. The map correction 544 is a representation of accuracy in the map data. The map correction 544 can include an error status for a particular data in the map. The map correction 544 can include an adjustment or an error flag regarding an edge or a path, a node, an entity, or a combination thereof.

The map evaluation module 516 can determine the map correction 544 based on the user preference profile 248 for representing the system user 108, the further participants 110, or a combination thereof. The map evaluation module 516 can determine the map correction 544 based on the user preference profile 248 using the correlated grouping 210 for representing a common area corresponding to the map correction 544.

The map evaluation module 516 can determine the map correction 544 for erroneous connections, such as erroneous disconnect in one or more path in the map or erroneous connection between paths. The map evaluation module 516 can determine the map correction 544 based on the avoidance area 350, the segment preference 348, or a combination thereof across multiple end users. The map evaluation module 516 can evaluate the avoidance area 350, the segment preference 348, or a combination thereof in the user preference profile 248 across members of the correlated grouping 210 according to geographic areas, such as for common or overlapping areas for 'work', 'home', 'school', commonly traversed paths, or a combination thereof.

The map evaluation module 516 can determine the map correction 544 for erroneous connection when quantity of end users corresponding to the same avoidance area 350 overlapping the target path or node exceeds a threshold predetermined by the navigation system 100. The map evaluation module 516 can similarly determine the map correction 544 for erroneous disconnect when sufficient amount of end users correspond to the previous trace 326 or positive instance of the segment preference 348 overlapping the target path or node.

It has been discovered that the map correction 544 based on the user preference profile 248 provides up-to-date accuracy in map data. The map correction 544 from the avoidance area 350 can provide data regarding the map based on daily movement and behavior of users even without direct crowd-sourced report or updates from other data providers.

The modules described in this application can be hardware implementation or hardware accelerators, including passive circuitry, active circuitry, or both, in the first storage circuit 414, the second storage circuit 446, the first control circuit 412, the second control circuit 434, or a combination thereof. The modules can also be hardware implementation or hardware accelerators, including passive circuitry, active circuitry, or both, within the first device 102 of FIG. 1, the second device 106 of FIG. 1, or a combination thereof but outside of the first storage circuit 414, the second storage circuit 446, the first control circuit 412, the second control circuit 434, or a combination thereof.

The navigation system 100 has been described with module functions or order as an example. The navigation system 100 can partition the modules differently or order the modules differently. For example, the decomposition module 506 can be combined with the tracking module 504 or the analysis module 508, or divided across the tracking module 504 and the analysis module 508. Also for example, the preference module 510 can include one or more sub-modules dedicated to processing one or more portions of the user preference profile 248. Also for example, the analysis module 508 can be implemented as a sub-module within the preference module 510.

For illustrative purposes, the various modules have been described as being specific to the first device 102 or the second device 106. However, it is understood that the modules can be distributed differently. For example, the various modules can be implemented in a different device, or the functionalities of the modules can be distributed across multiple devices. Also as an example, the various modules can be stored in a non-transitory memory medium As a more specific example, one or more modules described above can be stored in the non-transitory memory medium for distribution to a different system, a different device, a different user, or a combination thereof, for manufacturing, or a combination thereof. Also as a more specific example, the modules described above can be implemented or stored using a single hardware unit or circuit, such as a chip or a processor, or across multiple hardware units or circuits.

The modules described in this application can be stored in the non-transitory computer readable medium. The first storage circuit 414, the second storage circuit 446, or a combination thereof can represent the non-transitory computer readable medium. The first storage circuit 414, the second storage circuit 446, or a combination thereof, or a portion therein can be removable from the first device 102, the second device 106, or a combination thereof. Examples of the non-transitory computer readable medium can be a non-volatile memory card or stick, an external hard disk drive, a tape cassette, or an optical disk.

The physical transformation from the user preference profile 248, the preference-based route 234, the candidate route set 212, or a combination thereof results in the movement in the physical world, such as physical change in information communicated for the user on one or more of the devices or physical displacement of the system user 108 carrying the first device 102. Movement in the physical world results in updates to the contextual parameters 244, the selected route 236, the previous trace 326, or a combination thereof, which can be fed back into the navigation system 100 and further influence or update the user preference profile 248.

Figure 6:
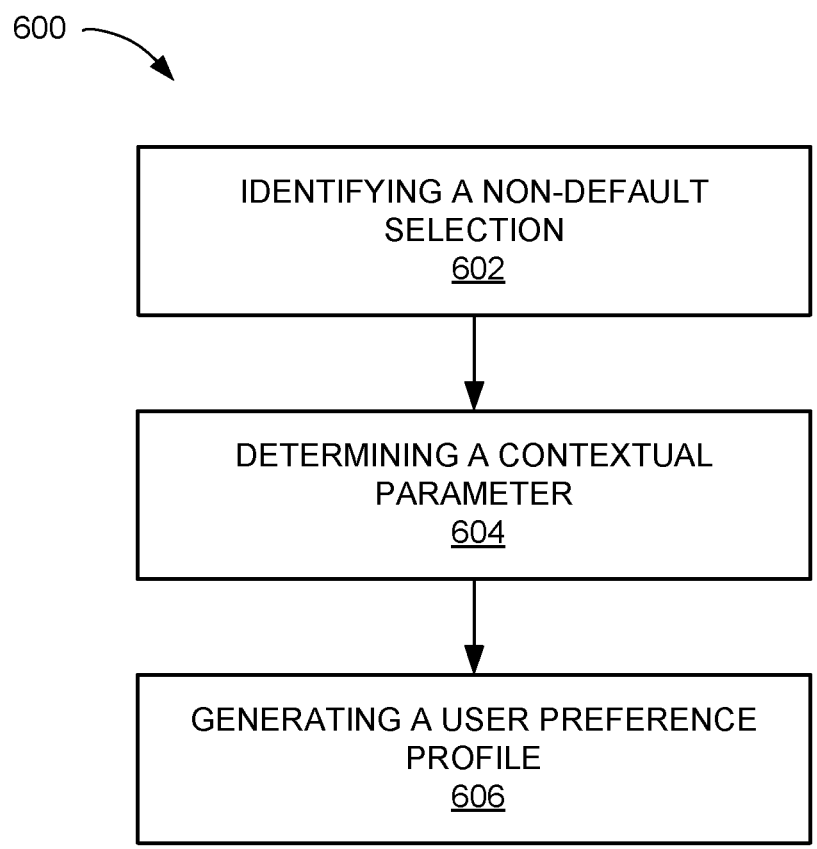
FIG. 6 is a flow chart of a method of operation of a navigation system in an embodiment of the present invention.

Referring now to FIG. 6, therein is shown a flow chart of a method 600 of operation of a navigation system 100 in an embodiment of the present invention. The method 600 includes: identifying a non-default selection for a selected route in a block 602; determining a contextual parameter corresponding to the non-default selection in a block 604; and generating a user preference profile based on the contextual parameter of the non-default selection for representing a preference of a system user for navigation information in a block 606.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A method of operation of a navigation system comprising:
    identifying a non-default selection for a selected route;
    determining a contextual parameter corresponding to the non-default selection;
    generating with a control circuit a user preference profile based on the contextual parameter of the non-default selection for representing a preference of a system user for navigation information;
    determining a map correction for erroneous connections, including an erroneous disconnect in one or more paths in a map or an erroneous connection between paths, based on the user preference profile for representing the system user; and
    sending the non-default selection for the selected route for display on a display interface.

2. The method as claimed in claim 1 wherein generating the user preference profile includes:
    generating an initial profile based on a user grouping for representing further participants corresponding to the system user; and
    generating the user preference profile based on updating the initial profile using the contextual parameter of the non-default selection.

3. The method as claimed in claim 1 further comprising determining the map correction based on the user preference profile for representing further participants.

4. The method as claimed in claim 1 wherein generating the user preference profile includes:
    identifying the selected route including a shortest route, a fastest route, or a combination thereof from user history;
    generating the user preference profile based on comparing the non-default selection with the selected route including the shortest route, the fastest route, or a combination thereof.

5. The method as claimed in claim 1 wherein generating the user preference profile includes:
    determining a recent time-window;
    calculating a recent deviation trend corresponding to the recent time-window from the non-default selection; and
    updating the user preference profile based on the recent deviation trend.

6. The method as claimed in claim 1 wherein generating the user preference profile includes:
    generating a preference analysis set based on the non-default selection;
    generating a control set based on the selected route including a shortest route, a fastest route, or a combination thereof from user history; and
    generating the user preference profile based on the preference analysis set and the control set.

7. The method as claimed in claim 6 further comprising:
    determining a user grouping including a correlated grouping for representing further participants similar to the system user; and
wherein:
    generating the user preference profile includes generating an initial profile based on the correlated grouping, the initial profile for representing the system user.

8. The method as claimed in claim 6 further comprising:
determining a user grouping including a correlated grouping for representing further participants similar to the system user; and
determining the map correction based on the user preference profile using the correlated grouping for representing a common area corresponding to the map correction.

9. The method as claimed in claim 6 wherein generating the user preference profile includes calculating an arrival-time adjustment for personalizing an arrival time estimate for the system user.

10. The method as claimed in claim 6 wherein:
generating the user preference profile includes generating the user preference profile including a maneuver preference, a segment preference, a rating preference, an optimization preference, a brand preference, an entertainment preference, or a combination thereof; and
further comprising:
generating a preference-based route based on the user preference profile for personalizing the preference-based route for the system user.

11. A navigation system comprising:
a control circuit configured to:
identify a non-default selection for a selected route;
determine a contextual parameter corresponding to the non-default selection;
generate a user preference profile based on the contextual parameter of the non-default selection for representing a preference of a system user for navigation information;
determine a map correction for erroneous connections, including an erroneous disconnect in one or more paths in a map or an erroneous connection between paths, based on the user preference profile for representing the system user;
a storage circuit, coupled to the control circuit, configured to store the user preference profile; and
a communication unit, coupled to the control circuit, configured to send the non-default selection for the selected route for display on a display interface.

12. The system as claimed in claim 11 wherein the control circuit is configured to:
generate an initial profile based on a user grouping for representing further participants corresponding to the system user; and
generate the user preference profile based on updating the initial profile using the contextual parameter of the non-default selection.

13. The system as claimed in claim 11 wherein the control circuit is configured to determine the map correction based on the user preference profile for representing further participants.

14. The system as claimed in claim 11 wherein the control circuit is configured to:
identify the selected route including a shortest route, a fastest route, or a combination thereof from user history;
generate the user preference profile based on comparing the non-default selection with the selected route including the shortest route, the fastest route, or a combination thereof.

15. The system as claimed in claim 11 wherein the control circuit is configured to:
determine a recent time-window;
calculate a recent deviation trend corresponding to the recent time-window from the non-default selection; and
update the user preference profile based on the recent deviation trend.

16. A non-transitory computer readable medium including instructions for a navigation system comprising:
identifying a non-default selection for a selected route;
determining a contextual parameter corresponding to the non-default selection;
generating a user preference profile based on the contextual parameter of the non-default selection for representing a preference of a system user for navigation information;
determining a map correction for erroneous connections, including an erroneous disconnect in one or more paths in a map or an erroneous connection between paths, based on the user preference profile for representing the system user; and
sending the non-default selection for the selected route for display on a display interface.

17. The non-transitory computer readable medium including the instructions as claimed in claim 16 further comprising:
generating an initial profile based on a user grouping for representing further participants corresponding to the system user; and
generating the user preference profile based on updating the initial profile using the contextual parameter of the non-default selection.

18. The non-transitory computer readable medium including the instructions as claimed in claim 16 further comprising determining the map correction based on the user preference profile for representing further participants.

19. The non-transitory computer readable medium including the instructions as claimed in claim 16 wherein:
identifying the selected route including a shortest route, a fastest route, or a combination thereof from user history;
generating the user preference profile based on comparing the non-default selection with the selected route including the shortest route, the fastest route, or a combination thereof.

20. The non-transitory computer readable medium including the instructions as claimed in claim 16 wherein generating the user preference profile includes:
determining a recent time-window;
calculating a recent deviation trend corresponding to the recent time-window from the non-default selection; and
updating the user preference profile based on the recent deviation trend.

* * * * *